United States Patent [19]

Knop et al.

[11] Patent Number: 5,717,411

[45] Date of Patent: Feb. 10, 1998

[54] RADIATING WAVEGUIDE AND RADIO COMMUNICATION SYSTEM USING SAME

[75] Inventors: Charles M. Knop, Lockport; Edward L. Ostertag, New Lenox; Gregory S. Orseno, Lockport, all of Ill.

[73] Assignee: Andrew Corporation, Orland Park, Ill.

[21] Appl. No.: 425,078

[22] Filed: Apr. 19, 1995

[51] Int. Cl.$^6$ .................................................. H01Q 13/10
[52] U.S. Cl. ........................... 343/771; 343/770; 343/767; 333/237
[58] Field of Search .................... 373/771, 770, 373/767, 768; 333/236, 237, 239

[56] References Cited

U.S. PATENT DOCUMENTS

| | | | |
|---|---|---|---|
| 2,574,433 | 11/1951 | Clapp | 343/771 |
| 3,691,488 | 9/1972 | Holtum, Jr. | 333/84 |
| 3,963,999 | 6/1976 | Nakajima et al. | 333/84 |
| 4,280,225 | 7/1981 | Willis | 455/55 |
| 4,334,229 | 6/1982 | Boblett | 343/767 |
| 4,339,733 | 7/1982 | Smith | 333/237 |
| 4,366,457 | 12/1982 | Bode et al. | 333/237 |
| 4,599,121 | 7/1986 | Edwards et al. | 156/48 |
| 4,625,187 | 11/1986 | Bocher | 333/237 |
| 4,660,007 | 4/1987 | Edwards et al. | 333/237 |
| 4,788,552 | 11/1988 | Karlsson | 343/771 |
| 4,800,351 | 1/1989 | Rampalli et al. | 333/237 |
| 4,821,044 | 4/1989 | Kurtz | 343/771 |
| 4,873,528 | 10/1989 | Girard | 343/770 |
| 5,291,164 | 3/1994 | Levisse | 333/237 |
| 5,430,455 | 7/1995 | Heddebaut et al. | 343/770 |

FOREIGN PATENT DOCUMENTS

| | | |
|---|---|---|
| 8201456 | 1/1982 | France . |
| 62-295525 | 12/1987 | Japan . |
| 63-287104 | 11/1988 | Japan . |
| 2-288604 | 11/1990 | Japan . |
| 696659 | 9/1953 | United Kingdom . |
| 1156450 | 6/1969 | United Kingdom . |
| 1415485 | 11/1975 | United Kingdom . |

OTHER PUBLICATIONS

Gale DJ, and Beal JC. Comparative Testing of Leaky Coaxial Cables for Communications and Guided Radar. *IEE Trans. MTT*, 1980; vol. MTT–28, No. 9, 1006–1013.

Sako T, Misawa S, Naruse T, Yasuhara H, Oguchi M and Kato T. Leaky Coaxial Cable. *Fujikura Technical Review*, 1974; 26–39.

Ries E and Cuccia C. Status Report: Communications in Mass Transit Guided–Roadway Systems. *Microwave Systems News*, 1975; 24–42.

Milligan TA. *Modern Antenna Design*. McGraw–Hill Book Co., NY, 1985; 92–93.

Aihara K, Sakata Y and Tago N. Ultra–High–Bandwidth Heat Resistant Leaky Coaxial Cable. *Intl. Wire & Cable Symp Proc*, 1992; 732–738.

Levisse A. Leaky or Radiating? Radiation Mechanisms of Radiating Cables and Leaky Feeders–Channel Tunnel Applications. *Intl Wire & Cable Symp Proc*; 1992; 739–747.

Coraiola, A, Haag HG, Schulze–Buxloh and Thönnessen G. Leaky Coaxial Cable With Length Independent Antenna Receiving Level. *Intl Wire & Cable Symp Proc*; 1992; 748–756.

*Primary Examiner*—Hoanganh T. Le
*Attorney, Agent, or Firm*—Arnold, White & Durkee

[57] ABSTRACT

A radiating waveguide comprises an elongated waveguide with a transverse cross-section dimensioned to carry only the dominant mode at a selected operating frequency. One wall of the waveguide forms a continuous non-resonant longitudinal slot or equivalent thereof to produce a radiated field polarized perpendicularly to the slot. The slot extends substantially parallel to the axis of the waveguide and has a transverse dimension that is sufficiently narrow to substantially avoid the radiation of a field polarized parallel to the slot.

39 Claims, 27 Drawing Sheets

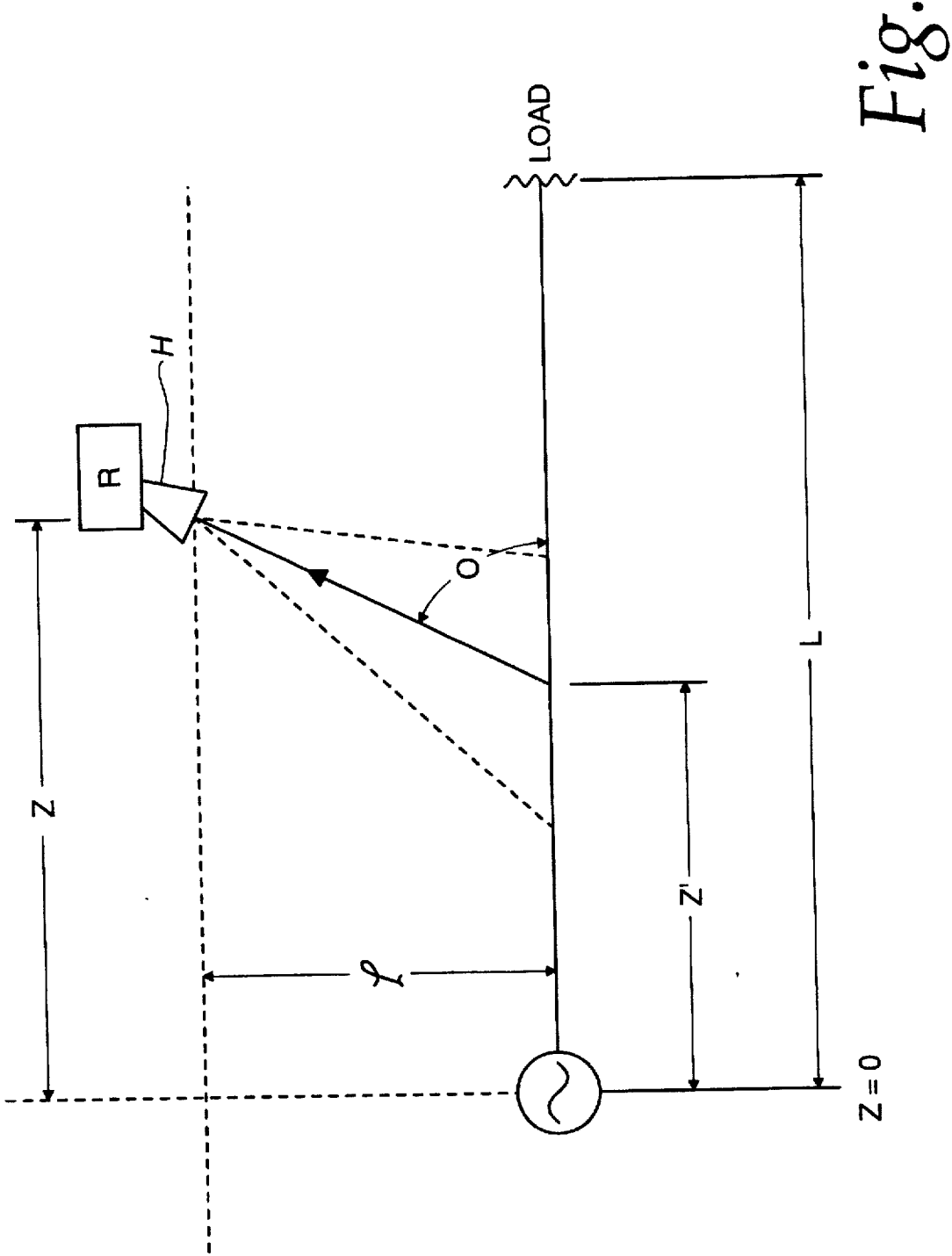

Field Strength, dB

Field Strength, dB

Field Strength, dB

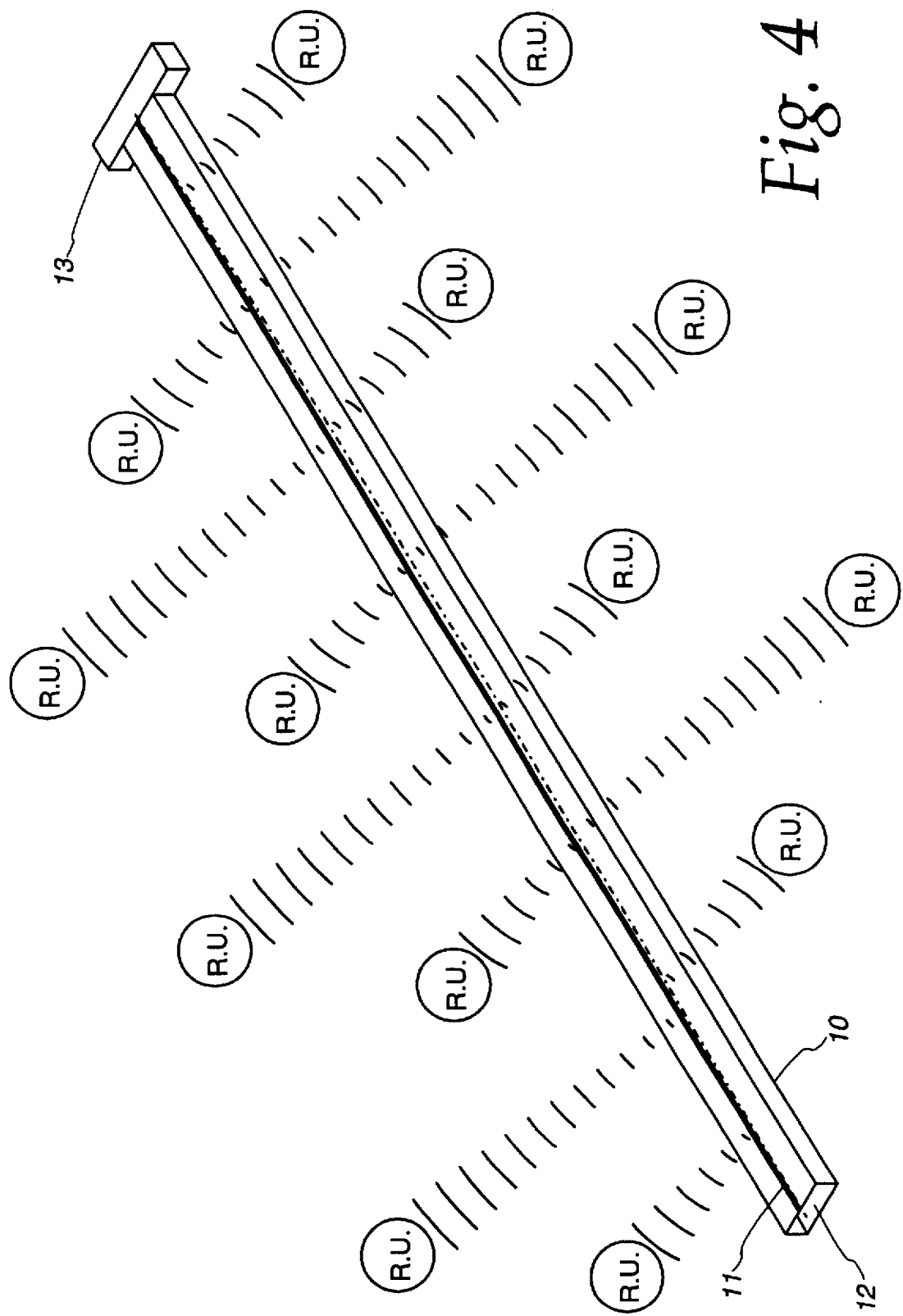

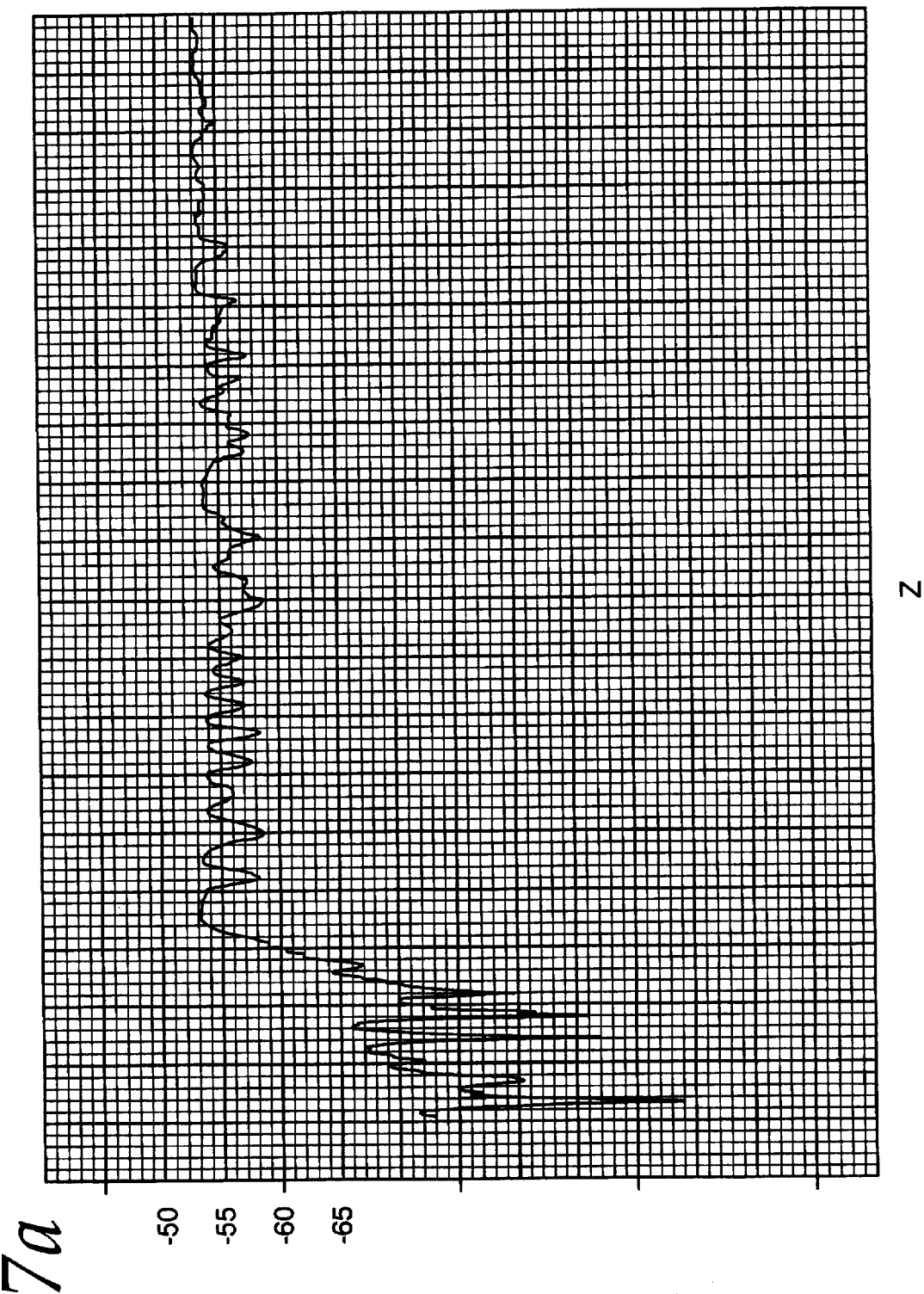

Field Strength, dB

Field Strength, dB

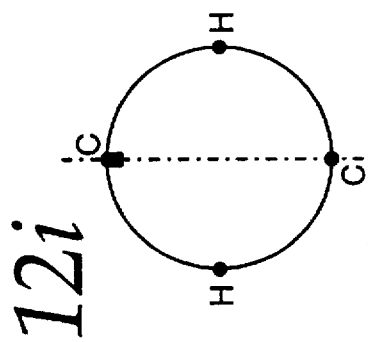
Fig. 12i
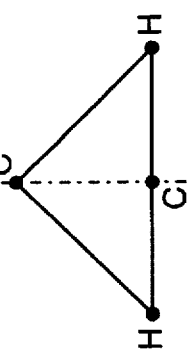
Fig. 12h
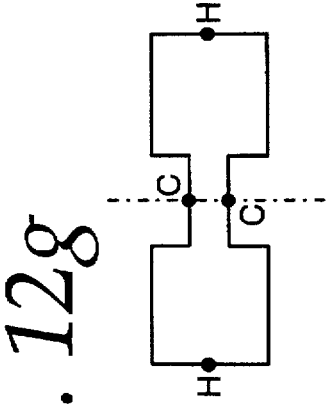
Fig. 12g
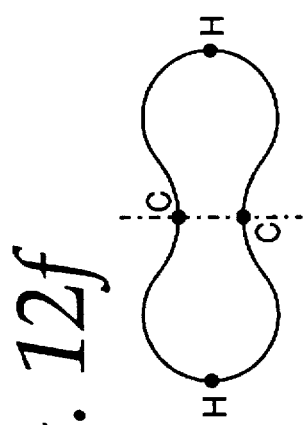
Fig. 12f
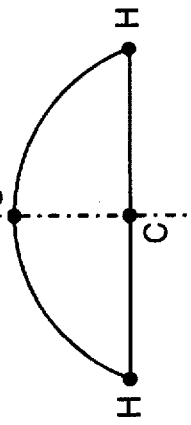
Fig. 12e
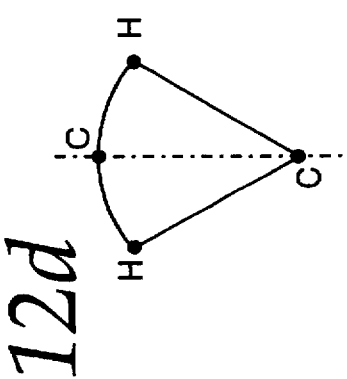
Fig. 12d
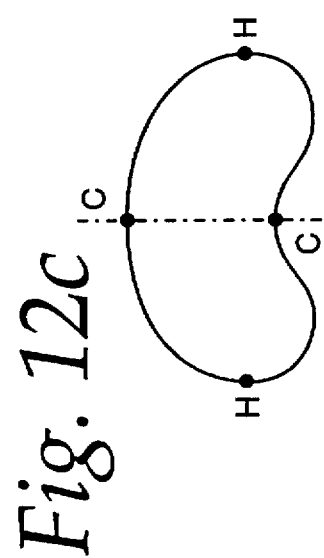
Fig. 12c
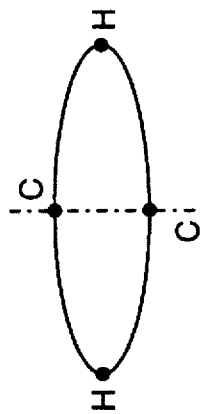
Fig. 12b
Fig. 12a

RADIATING WAVEGUIDE AND RADIO COMMUNICATION SYSTEM USING SAME

FIELD OF THE INVENTION

The present invention relates generally to radiating transmission lines, particularly slotted waveguides, and to radio communication systems that use such radiating transmission lines.

BACKGROUND OF THE INVENTION

Radiating coaxial cable has been used for many years in various types of radio communication systems. A typical layout is shown in FIG. 1 where the cable of length L produces a near field at the point P ($\zeta$,z) where the field is received by a "pick-up" horn H (whose axis makes an angle $\theta$ relative to the cable's axis) connected to a receiver R. At any given frequency, the field strength produced by such a cable can fluctuate rapidly as a function of the near-field axial position (i.e., $\zeta$ constant, z variable) along the length of the cable. Also, at any such near-field point along the length of the cable, the strength of the field produced by such a cable can vary rapidly as a function of frequency. For example, such fluctuations can be seen FIG. 2a which shows the measured field strength in dB versus axial distance along the cable at a given frequency for a coaxial radiating cable having many slots per wavelength. Superimposed upon these fluctuations is a gradual reduction in average field strength owing to the line's ohmic attenuation. The fluctuations along the cable are seen to be typically on the order of ±10 dB (but can approach −20 db). Similarly FIG. 2b shows the measured field strength in dB versus frequency at a given distance along the cable. Examination of FIG. 2b discloses that at any given receiving location along such a radiating cable, a system which requires a large bandwidth can have up to a 20-dB null in a given bandwidth, which can make the signal unrecoverable. As a result, such coaxial radiating cables are not generally acceptable for use in digital communication systems requiring low bit error rates ("BERs"). Digital data communications, for example, may require BERs as low as $10^{-8}$ to avoid significant data losses, and even digitized voice communications require BERs of $10^{-2}$.

One contemporary form of such a highly fluctuating radiating coaxial cable consists of a foam dielectric coaxial cable with a corrugated outer conductor which has radiating slots cut through the peaks of the corrugations. The foam dielectric reduces the phase velocity inside the cable to between 80% and 90% of the speed of light. This means that the wavelength inside the cable, i.e., the guide wavelength $\lambda g$, is 80% to 90% of the free space wavelength $\lambda v$. The corrugations, and thus the slots, are typically spaced at 4 or more per inch, leading to at least 20 slots per $\lambda g$ at the highest frequency used ($\lambda g$=5.558" for 80% velocity at 1700 MHz). The near-field patterns of this type of cable are highly oscillatory, as shown in FIGS. 2a and 2b, leading to excessive signal losses and high BERs. This type of cable produces both co-polar (i.e., transverse or perpendicular to the cable) and cross-polar (i.e., axial or parallel to the cable) components of electric field of negligible difference (i.e., equal magnitude), as can be seen from the measured co-polar components of FIGS. 2a and 2b and the corresponding measured cross-polar patterns of FIGS. 2c and 2d.

A second type of radiating coaxial cable has slots which are slanted with respect to the cable's axis (or a group of such slots to achieve wider bandwidth) spaced at periodic intervals $\lambda g$ along the length of the cable with the slant being the same from slot to slot. This same-slantedness and approximately $\lambda g$ slot spacing puts the transverse electric (co-polar) fields in the slots in phase, and thus all the slots radiate a transverse-polarized field off the cable at the same angle, $\theta$, of nearly 90° from the cable's axis. Unfortunately, the axial-electric (cross-polar) fields are also in phase and hence also radiate at an angle of 90° off the cable (though they are, typically, weaker, relative to their co-polar component, as compared to that for the first type of radiating cable (having many slots per $\lambda g$) since this second type has slots which are longer in the axial direction than in the transverse direction and are only slightly tilted relative to the axis). Thus the co-polar pattern of this second type of radiating cable has smaller fluctuations than that of the first cable type.

A third type of radiating coaxial cable with about $\lambda g2/$ slot spacing and using reversed zig-zag-shaped slots has also been used. This arrangement also causes the transverse-electric (co-polar) fields to be in phase and radiate at nearly 90° from the cable's axis but causes the axial-electric (cross-polar) fields to be nearly out of phase (exactly so for exactly $\lambda g/2$ slot spacing which, like exactly $\lambda g$ spacing in the second type of cable, is never used since a high input reflection occurs (i.e., the input VSWR to the cable "sees a spike"). This third type of radiating coaxial cable thus provides (one having smaller fluctuations) superior (one having smaller fluctuations) patterns as compared to those of the first and second types, but still radiates a substantial cross-polar component of electric field. For example, the measured co-polar and cross-polar components from a typical zig-zag cable are shown in FIGS. 3a through 3d as there defined (note that by comparing FIGS. 3a with 3c or 3b with 3d that the cross-polar component is about −7 to −9 dB relative to the co-polar).

The above cross-polar (axial) electric field is undesirable since it produces a "two-wire line effect" (hereafter referred to as "TWLE") where the outer metallic surface of the cable forms one line and an adjacent parallel surface (wall, floor, ceiling, etc.) forms the return line. The outgoing and return currents on this line produce a standing wave of current along the outside of the cable traveling at the speed of light (the space between the cable and the wall typically being filled with air). This standing wave current also radiates, and when superimposed on that radiated from the slots, produces, typically, a highly oscillatory field. The strength of these oscillations is diminished (and can, in fact, in the absence of reflections, be made sufficiently small) by spacing the cable an adequate distance away from the wall. Thus, because of the TWLE, a cable having a cross-polar component cannot produce a sufficiently non-oscillatory field unless (in the absence of reflections) it is adequately spaced from the wall. The first type cannot produce such a result even in free space, i.e., even in the absence of a wall or other adjacent surface. This TWLE effect is seen from the measurements made on, for example, the third type (zig-zag) of cable, where the measured co-polar field of FIG. 3a (that measured when the cable is put against a dry-wall with slots pointing away from the wall) degrades to that of FIG. 3e (that measured when the cable is put against the same dry-wall covered with a 3 foot wide metallic strip with, again, the slots pointing away from the wall) and where a further degradation occurs when this 3 foot metallic strip is present and the slots point toward the wall, as seen from the measurement of FIG. 3f. Regarding the first type of cable, its patterns are so bad (many deep oscillations) even against a dry-wall (FIG. 2a or 2b) that the further degradation due to a metallic wall is inconsequential. The second type of cable will be better than the first but worse than the third when a metallic wall is present.

A fourth type of radiating cable, more recently developed, similar to the second type above, employs a number of slots forming a group or cell, where all the slots are tilted relative to the cable's axis, and where the groups or cells are repeated at specific intervals. The slots in each cell are arranged such that at a given frequency only one constant phase-front is radiated. Thus, this type of cable can increase the band width beyond that of the second and third types described above. However, the slots radiate both axial and transverse polarizations, and this cable also produces a TWLE due to its axial currents. Thus, it too must be mounted a substantial distance away from a wall (or floor, ceiling, etc.) if a sufficiently non-oscillatory field is to be produced (in the absence of reflections), although, like the second and third cable types, the field it produces has fewer fluctuations than that of the first type of cable described above.

The above-described wall spacing requirement imposed on the aforementioned four types of coaxial cable radiators, to achieve a sufficiently non-oscillatory field, makes them vulnerable to mechanical vibrations, air-vortex and physical damage. Also, because the cross-polar component of the signal radiated from all four types of cables can be reflected (especially in an indoor environment) from nearby walls, floors, etc., and be reconverted to a co-polar signal, this reflected co-polar signal can add destructively with the directly radiated co-polar signal, again giving rise to an oscillatory net field. Thus the latter three types of coaxial radiating cable must be operated close to the observation point if a satisfactory low-oscillatory field is to be realized (typically 5 feet or less). The first type still has a highly oscillatory field area at these close distances.

Thus, when any of the radiating cables described above are used in radio communication systems, the amplitude fluctuations of the near field, at a given observation point, can vary widely with frequency across the operating bandwidth. The amplitude of the near-field fluctuations can, at a given frequency, also vary widely along the length of the cable. Both of these near-field fluctuations can lead to unacceptable signal loss or BERs. This poor performance is attributed to the high level of cross polarization produced by all of the above cable types (e.g., about 0 dB, higher than −7 dB, −7 dB, and higher than −7 dB, for the four cable types, respectively). Thus, there is a need for an improved radiating transmission line that is suitable for use in radio communication systems, where this improvement requires that the radiation have as low a cross-polarization as possible.

SUMMARY OF THE INVENTION

It is a primary object of the present invention to provide an improved radiating waveguide that has very low cross-polarization (i.e., that has a polarization parallel to the waveguide's axis which is very low) and hence will provide the attainment of low BERs when used for digital communications, minimize distortion when used for analog communications, and have lower transmission loss than existing coaxial cable radiators.

It is another object of this invention to provide such an improved radiating waveguide that is capable of producing a substantially flat frequency response, i.e., having small field strength fluctuations, at any fixed-arbitrary near-field point, across the entire frequency bandwidth of the waveguide. A related object of the invention is to provide such a system which produces, at a given frequency, a near-field pattern having small field strength fluctuations along the entire effective length of the radiating waveguide (where the effective length is equal to the length of the waveguide, L, but commencing at $Z = Z_{start} = \zeta/\tan\hat{\theta}$ and ending at $Z = L + Z_{start}$).

A further object of the invention is to provide such an improved radiating waveguide which, since it avoids any significant generation of cross-polarized fields, does not produce a TWLE or reflected cross-polar signals which reconvert to co-polar signals. A related object is to provide such a radiating waveguide which avoids any significant radiation attenuation of signals propagated longitudinally through the waveguide.

Yet another object of this invention is to provide such an improved radiating waveguide which can be mounted close to, or even on, a wall (even a metallic wall) or other surface without significantly degrading the operation of the radio communication system in which the radiating waveguide is used.

Still another object of the invention is to provide such an improved radiating waveguide which greatly reduces the problem of multi path-reflected cross-polar signals being reconverted to co-polar signals and hence allows either a small or large separation between the radiating waveguide and the receiver.

A still further object of the invention is provide such an improved radiating waveguide that can be efficiently and economically manufactured in long lengths.

Another object of this invention is to provide an improved radio communication system using such improved radiating waveguide.

Other objects and advantages of the invention will be apparent from the following detailed description and the accompanying drawings.

In accordance with the present invention, the foregoing objectives are realized by providing an elongated waveguide which includes one or more longitudinal slots to produce a radiated field polarized perpendicularly to the slot (and hence to the axis of the waveguide), and having a near field encompassing a prescribed area. The dimensions and location of the slot or slots in the waveguide wall are selected to produce, at any given point in the near field, an amplitude response having only small amplitude fluctuations across the operating bandwidth. Also, at any given frequency within the operating bandwidth, the radiating waveguide produces a near-field pattern having only small amplitude fluctuations along the effective length of the waveguide. The near-field amplitude fluctuations of the radiating waveguide are preferably less than about ±3 dB in either an indoor or outdoor environment over the operating bandwidth of the system and along the effective length of the waveguide (and at any perpendicular distance, $\zeta$, from the waveguide ranging from about 1 foot to about 50 feet).

Because of the substantially flat near-field pattern (i.e., the small amplitude fluctuations), the system of this invention yields extremely low BERs when used for digital communications, and low levels of distortion when used for analog communications, all at low loss. The system also has a wide bandwidth, so that data can be transmitted at high data rates.

A preferred embodiment of the radiating waveguide of this invention is a dominant-single-moded rectangular waveguide in which one of the wide walls of the waveguide contains a continuous non-resonant axial slot (or equivalent thereof) to produce a radiated field polarized perpendicularly to the slot (and hence to the axis of the waveguide). The slot is parallel to the waveguide's axis and is located and dimensioned so that no significant axial currents are cut by the slot, and thus no significant cross-polarized fields are generated. For example, when the slot is located in the wide wall of a dominant-mode rectangular waveguide, the slot has a narrow transverse dimension so that no significant axial currents are cut by the slot. The slot is also offset only slightly from the longitudinal center line of the wide wall of the waveguide to minimize the radiation, and hence to avoid any significant radiation-attenuation of signals propagated longitudinally through the waveguide. When the longitudinal slot is located in the narrow wall (which has only transverse currents) of a dominant-mode rectangular waveguide, there are no axial currents to be cut, but the slot must be made extremely narrow to avoid excessive radiation. When a segmented slot is used in either the wide wall or the narrow wall to approximate a continuous slot, the spacing and dimensions of the slot segments should provide at least $[1+(v/c)^{-1}]$ openings per free space wavelength along the length of the waveguide. The slot segments are located far enough from the center line of the waveguide wall to achieve the same level of co-polar (perpendicular) radiation produced by the section of continuous slot they are intended to approximate.

When a segmented longitudinal slot is formed in the narrow wall of a rectangular waveguide, it should not be tilted relative to the transverse direction because such tilting can produce excessive cross-polarized (axial) radiation.

The improved radio communication system of this invention includes the above waveguide located within or adjacent to a prescribed area containing a multiplicity of radio transmitters, receivers or transceivers ("radio units"), which may be either mobile or fixed. Signals are transmitted to and received from the various radio units via the waveguide.

BRIEF DESCRIPTION OF THE DRAWINGS

FIG. 1 is a diagrammatic illustration of the geometry of a radiating coaxial cable and an associated receiving system operating at a frequency of fMHz;

FIG. 4 is a perspective view of a radiating waveguide embodying the invention, with associated radio units illustrated in schematic form;

FIG. 7a is a near-field co-polar pattern produced by one example of the waveguide illustrated in FIG. 4, measured (indoors) along the length of the waveguide, at a distance 20 feet away from the waveguide, while operating at a fixed frequency with an impedance-matching load connected to the far end of the waveguide.

FIG. 8 is a predicted (outdoor) pattern corresponding to FIG. 7a, but where +26 dB in FIG. 8 corresponds to approximately −57 dB in FIG. 7a;

FIGS. 12a–i are series of diagrammatic transverse cross sections of other waveguide configurations which can be used instead of the dominant-mode rectangular waveguide, showing the approximate slot location for slight ("C") and great ("H") amounts of co-polar (transverse) radiation.

DETAILED DESCRIPTION OF THE PREFERRED EMBODIMENTS

Figure 2A:
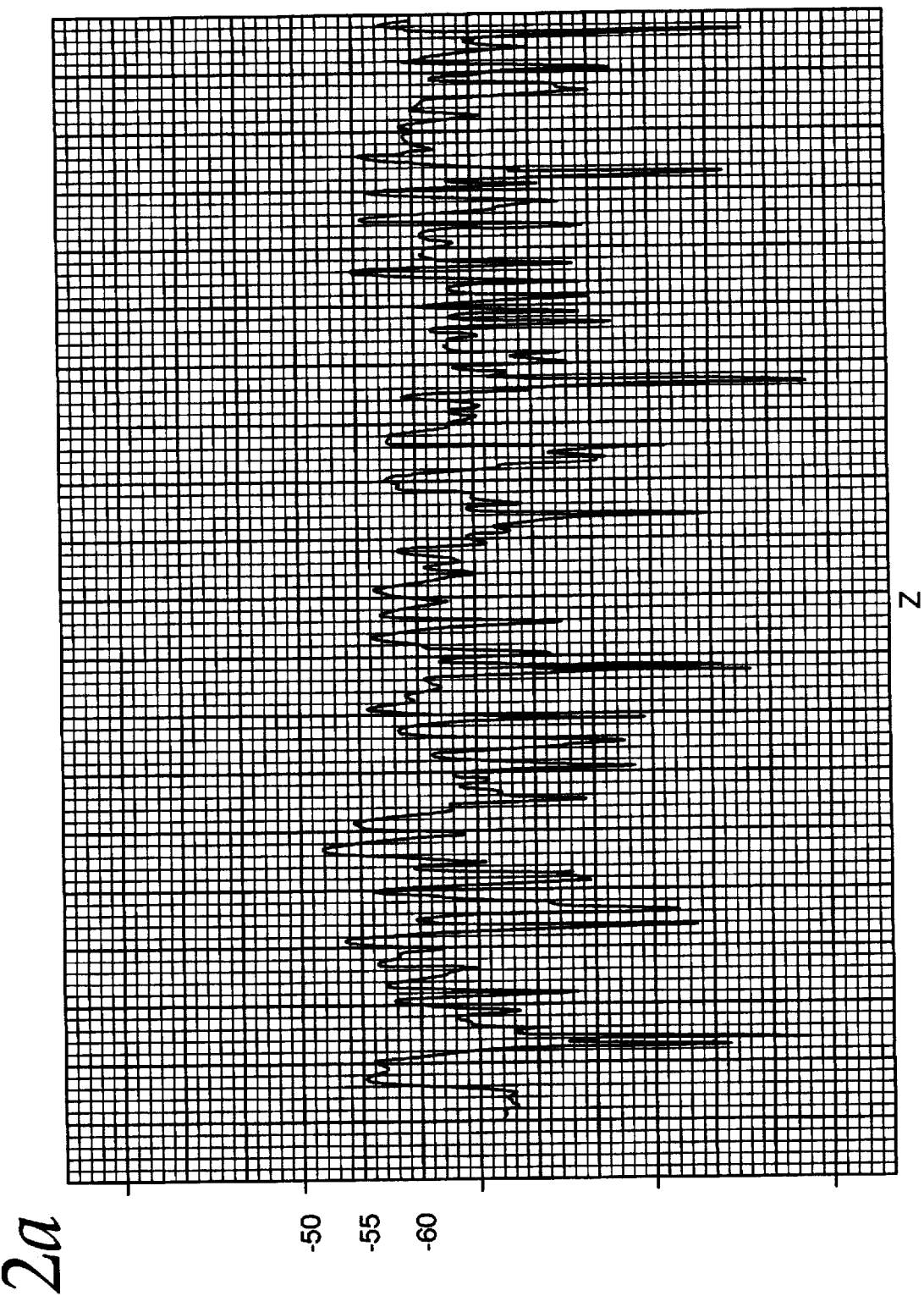
FIG. 2 is a set of measured fields produced indoors by a Type 1 radiating cable: (a) co-polar vs. z, $\zeta$=20 feet, f=1,850 MHz, (b) co-polar vs. frequency, z =30 feet, $\zeta$=20 feet, (c) cross-polar vs. z, $\zeta$=20 feet, f=1,850 MHz, and (d) cross-polar vs. frequency, z=30 feet, $\zeta$=20 feet (note that in FIGS. 2a and 3c the starting and ending points of the curve correspond to z=0 and z=65 feet, respectively, as is also true for all the dBv z curves below)
Figure 2B:
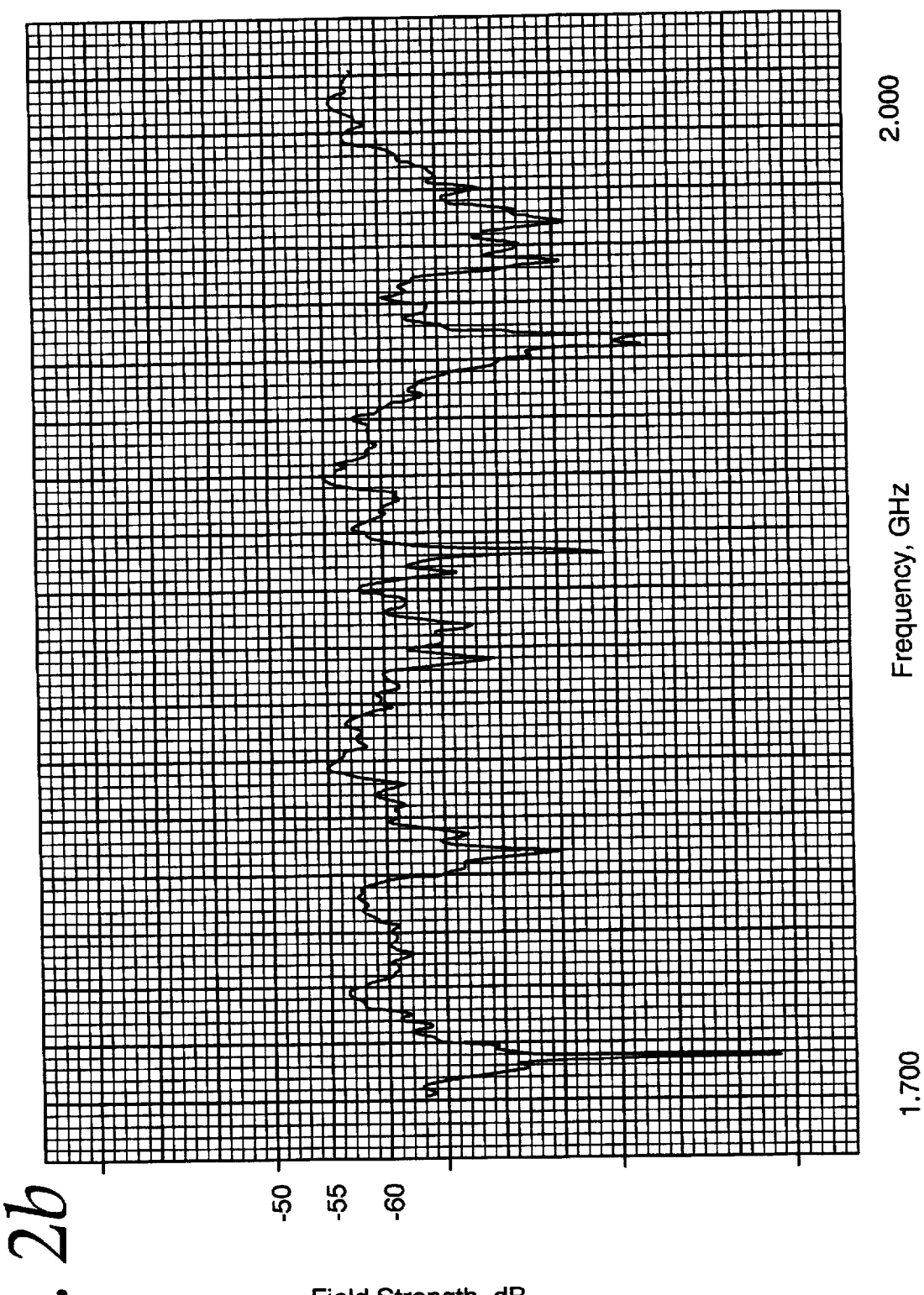
Figure 2C:
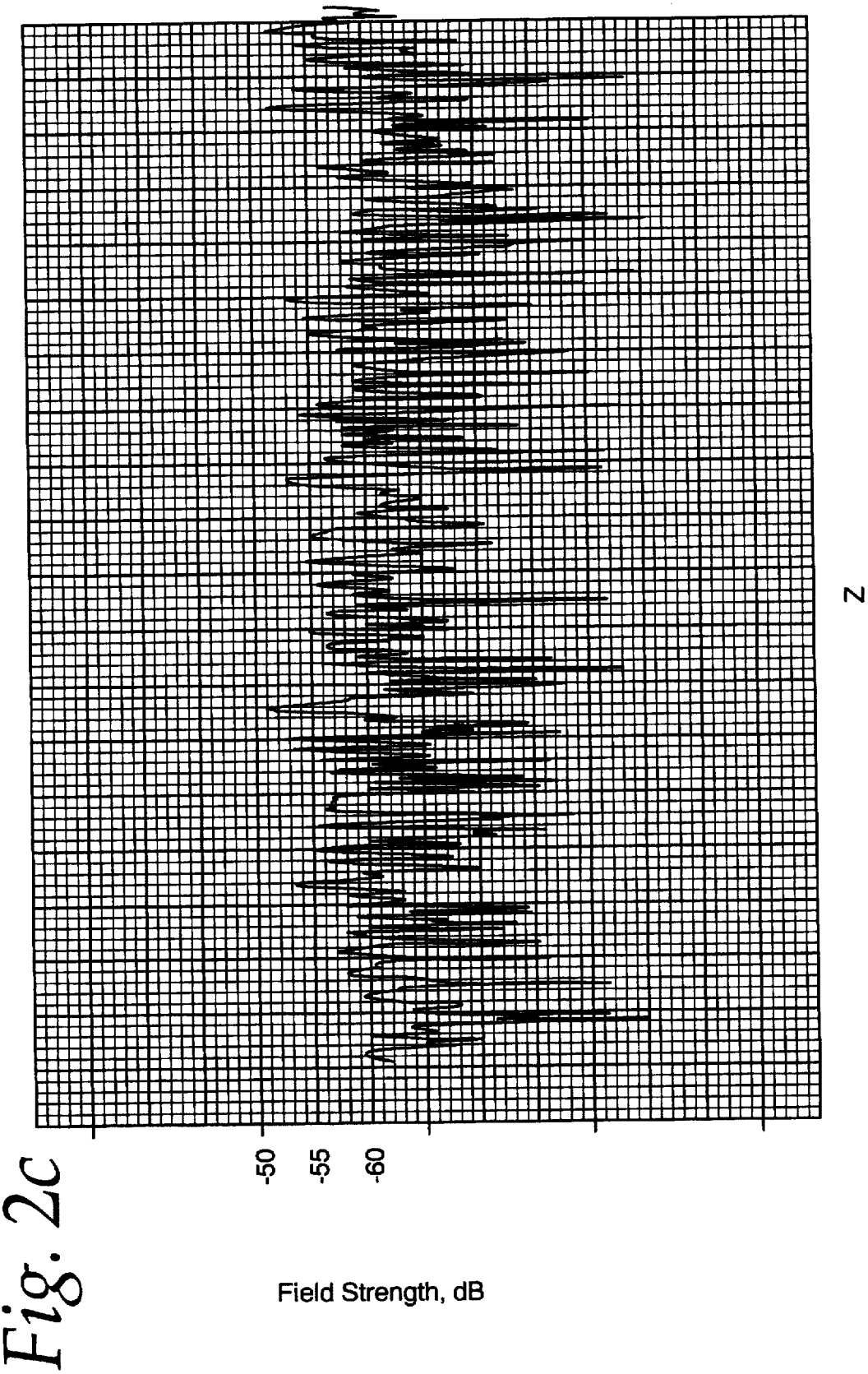
Figure 2D:
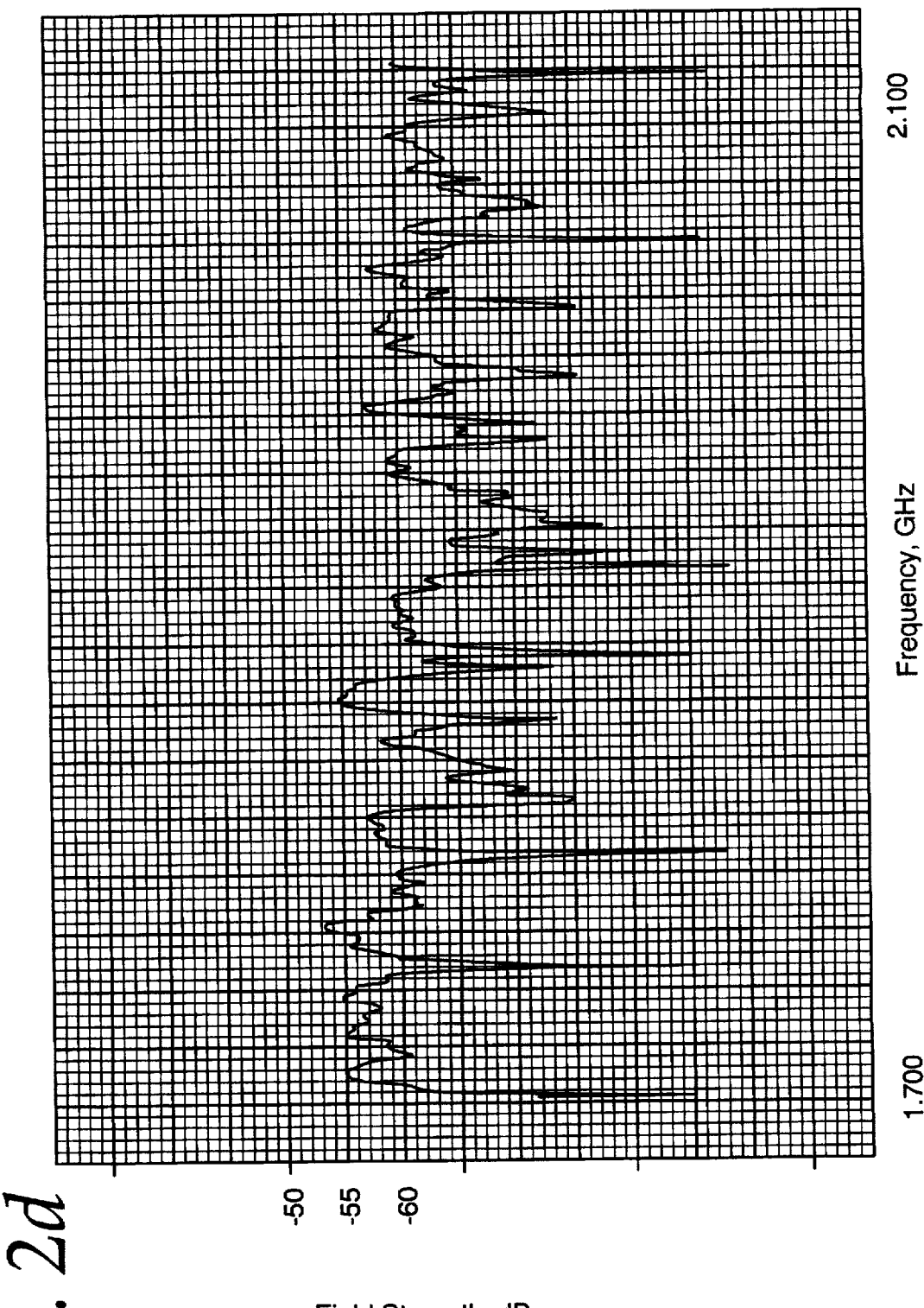
Figure 3A:
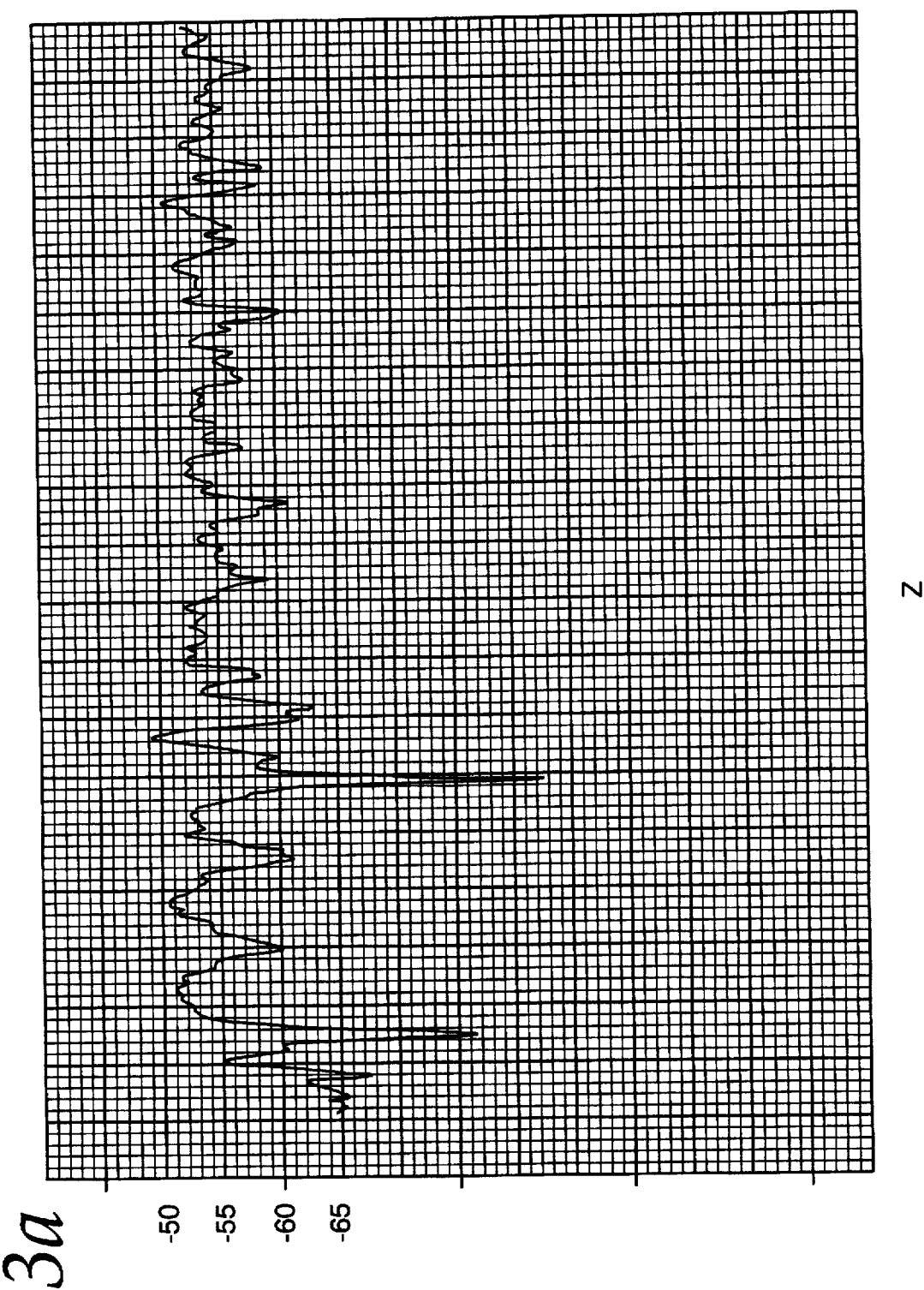
FIG. 3 is a set of measured fields produced indoors by a type 3 radiating cable: (a) co-polar vs. z, $\zeta$=20 feet, f=1,850 MHz, (b) co-polar vs. frequency, z =30 feet, $\zeta$=20 feet, (c) cross-polar vs. z, $\zeta$=20 feet, f=1,850 MHz, and (d) cross-polar vs. frequency, z=30 feet, $\zeta$=20 feet.
FIG. 3e is a near field co-polar pattern measured under the same conditions as FIG. 3a but with a 3-foot metallic strip inserted on the dry-wall (and, like FIG. 3a, with the slots pointing away from the wall)
FIG. 3f is a near field co-polar pattern measured under the same conditions as FIG. 3e but with the slots pointed at the wall.
Figure 3B:
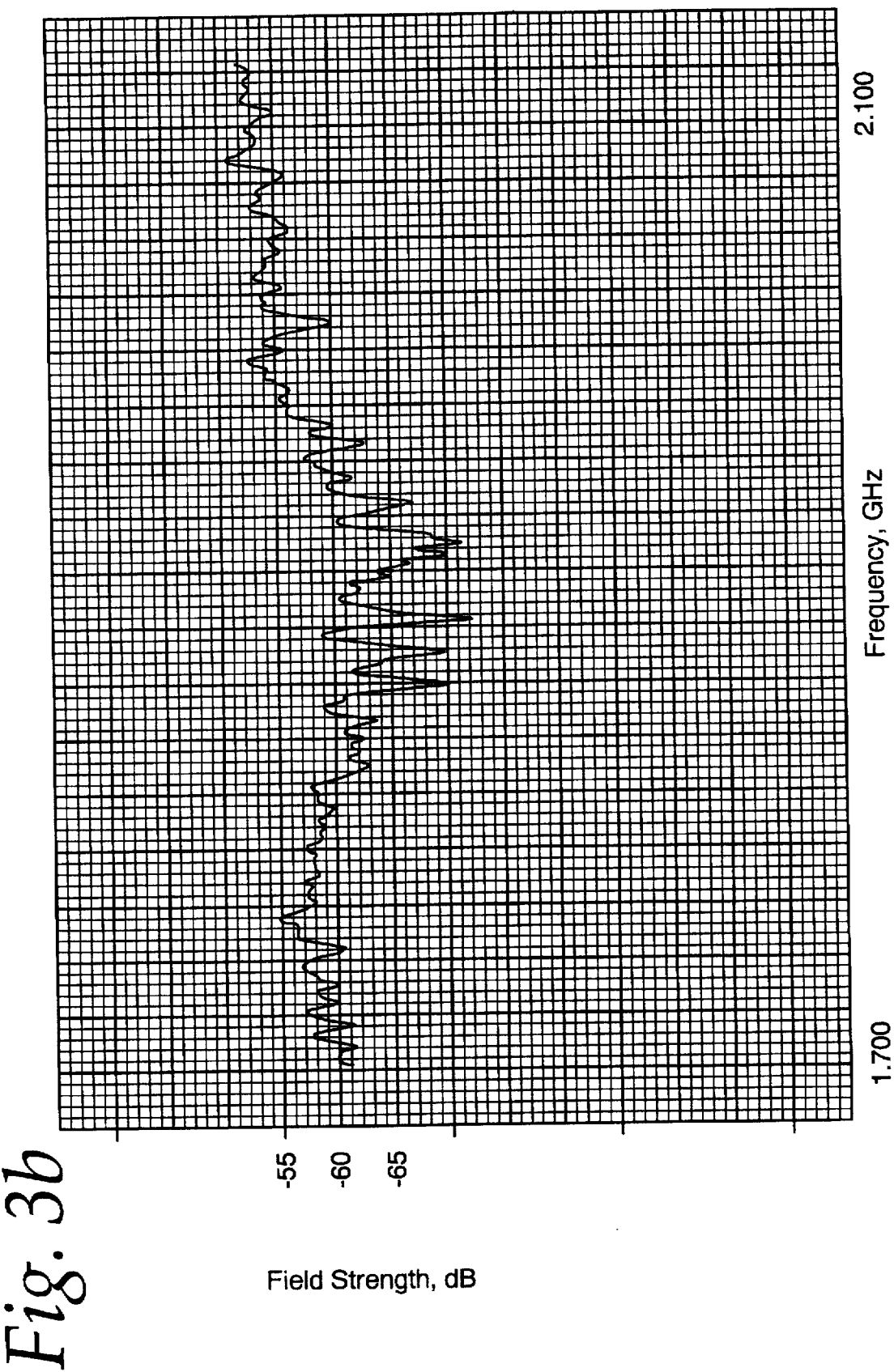
Figure 3C:
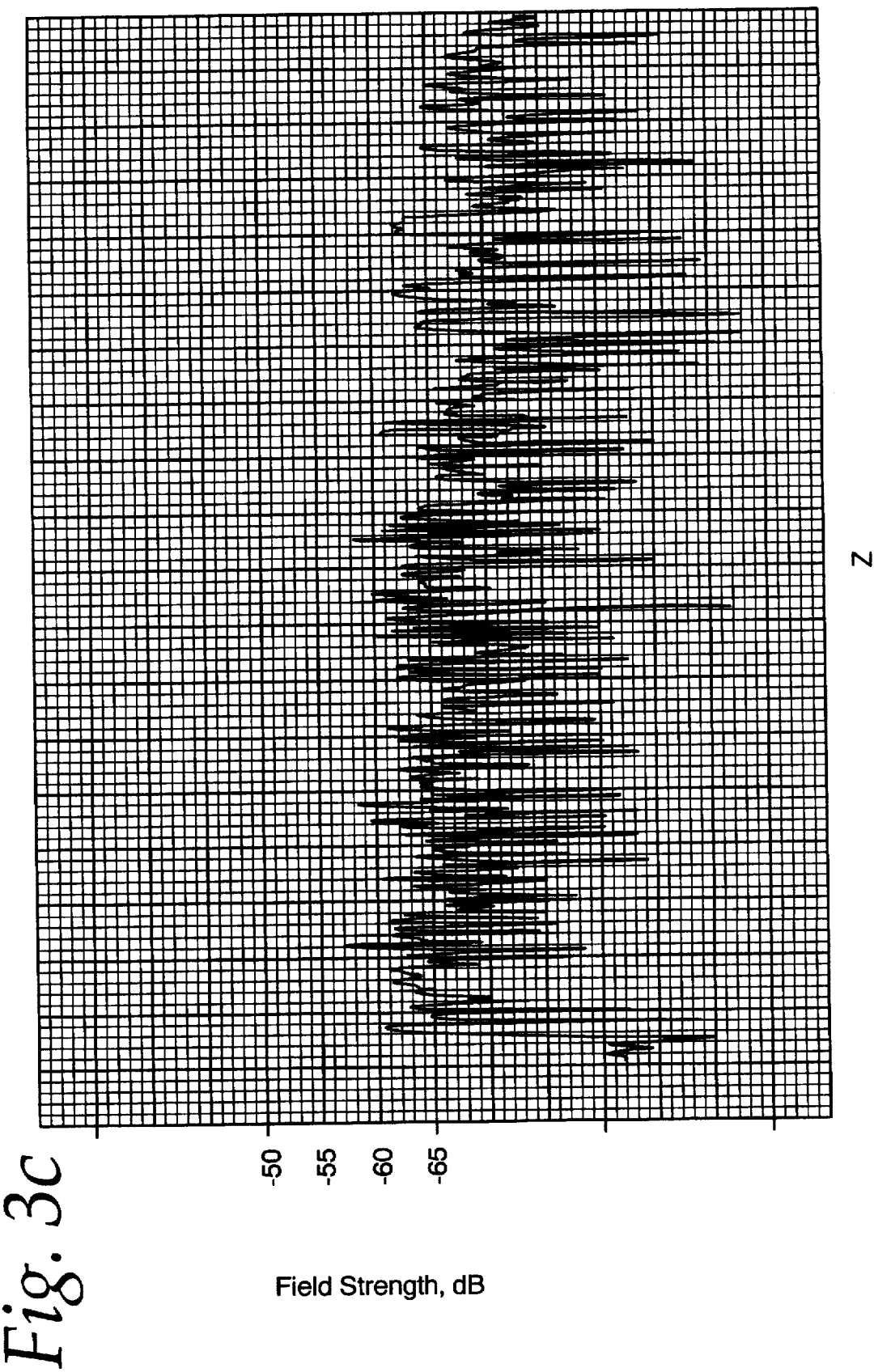
Figure 3D:
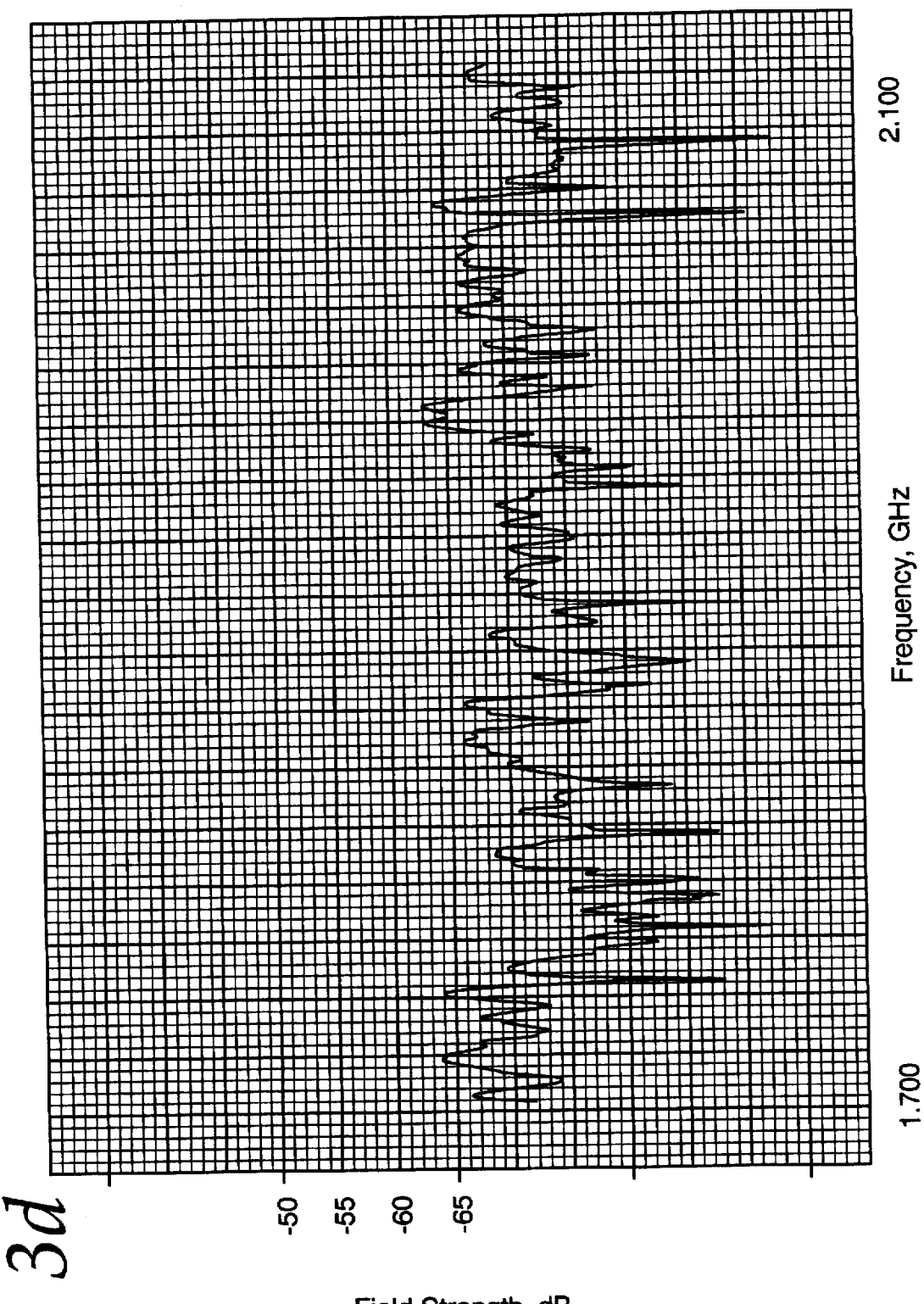
Figure 3E:
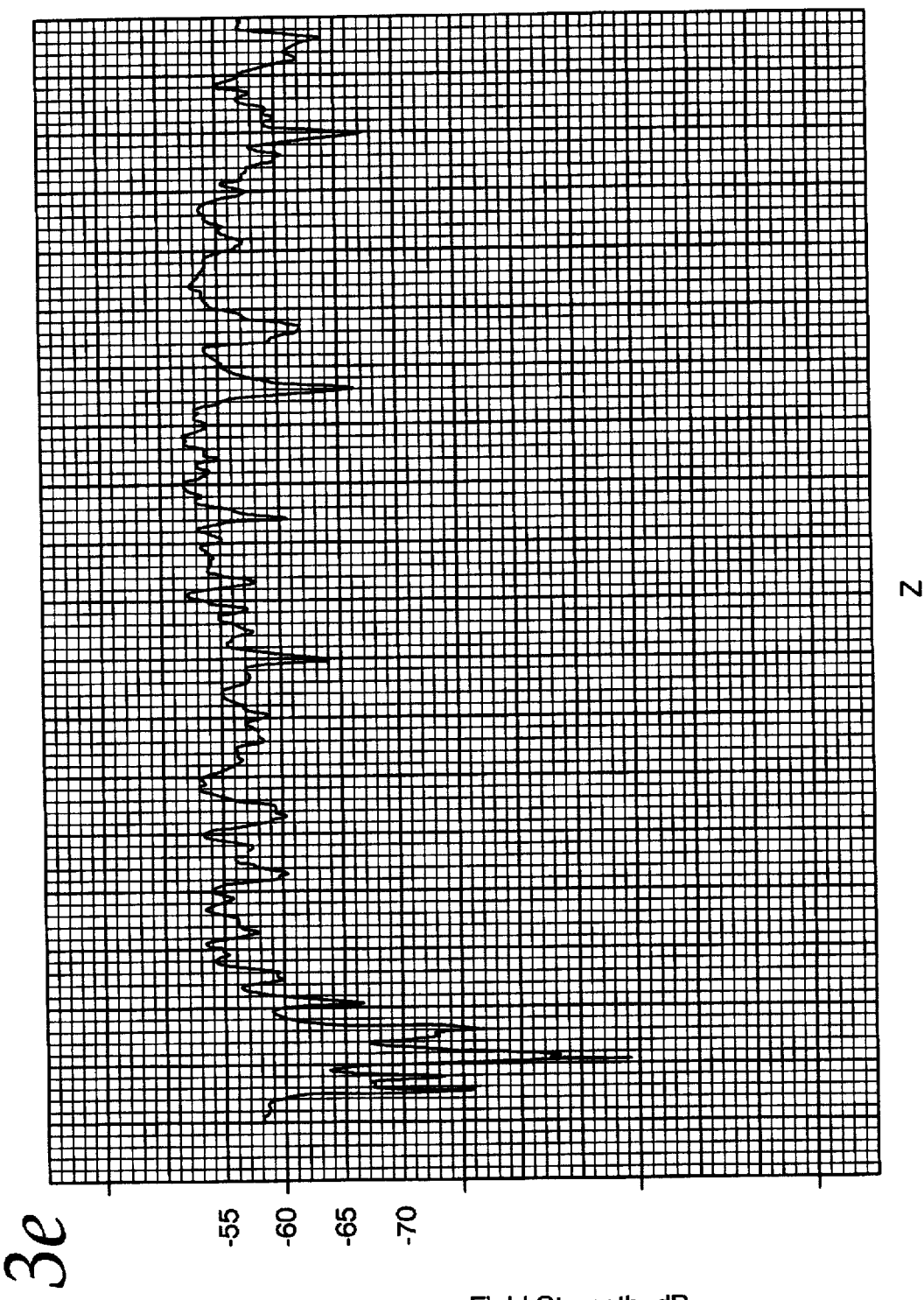
Figure 3F:
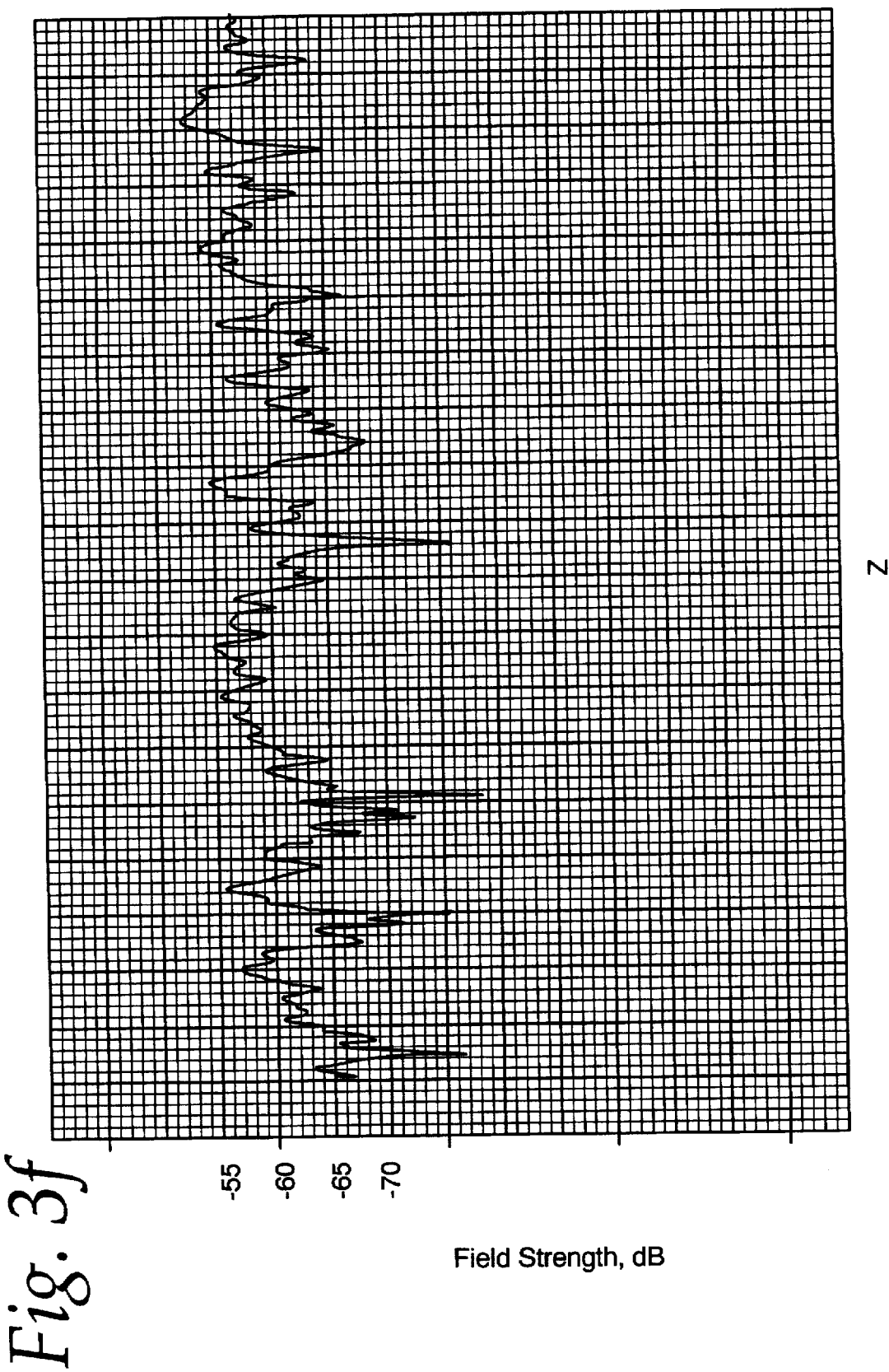

While the invention is susceptible to various modifications and alternative forms, specific embodiments thereof have been shown by way of example in the drawings and will be described in detail herein. It should be understood, however, that it is not intended to limit the invention to the particular forms disclosed, but, to the contrary, the intention is to cover all modifications, equivalents and alternatives falling within the spirit and scope of the invention as defined by the appended claims.

Figure 5:
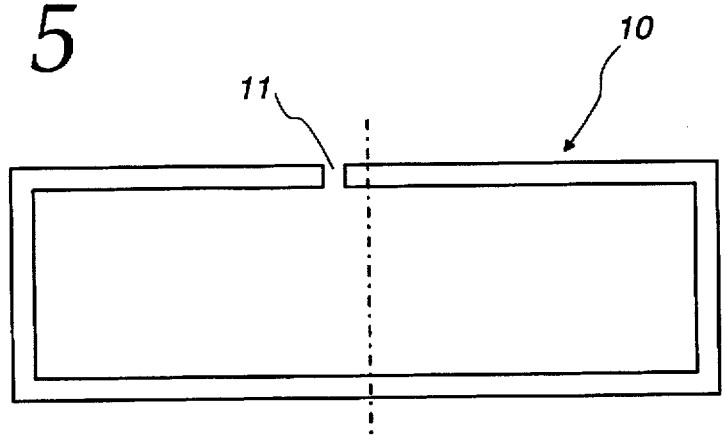
FIG. 5 is an enlarged transverse sectional view of the waveguide of FIG. 4, with the transverse centerline of the wide walls of the waveguide illustrated by a broken line.

Referring now to the drawings, FIGS. 4 and 5 illustrate a length L of rigid rectangular waveguide 10 having a single continuous slot 11 formed in one of the wide walls of the waveguide. The waveguide 10 is dominant-single-moded, i.e., it is dimensioned to carry only the dominant mode at the operating frequency. When a signal is fed into one end 12 of the waveguide 10 and propagated through the waveguide to a matched load 13 at the opposite end, a portion of the signal is radiated from the slot 11 along the entire length of the waveguide. The radiated field is polarized perpendicularly to the slot 11, and can be detected by radio units R.U. anywhere along the length of the waveguide. The waveguide 10 can also receive radiated signals from the radio units R.U. anywhere along the length of the waveguide. These received signals are propagated through the waveguide to a receiver (not shown) at the end 12 of the waveguide.

The radiating waveguide 10 may be used in a wide variety of different applications where multiple radio units, often mobile units, must communicate with one or more base stations within a defined area. One example of such a system is a highway or railroad communication system in which the radiating waveguide extends along an open highway or railroad (or, also, in a tunnel) for constant communication with mobile radio units in the various vehicles on the open highway or railroad (or in the tunnel). Another example is a wireless local area network (WLAN) of personal computers, printers, servers and the like, located in a common building or on a common floor. This invention is most useful in applications where the communication area is sufficiently large such that the waveguide 10 must be at least 60 feet in length.

Figure 6:
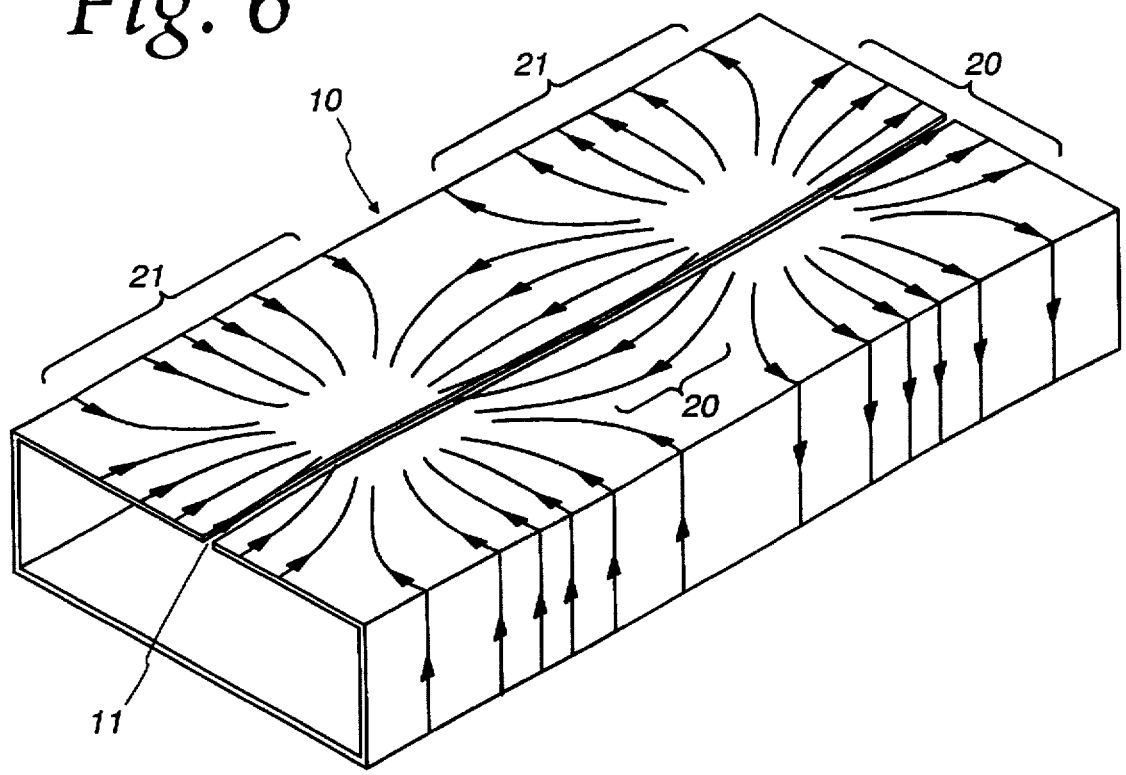
FIG. 6 is a diagrammatic illustration of the wall currents on the inner walls of the waveguide of FIG. 4.

FIG. 6 illustrates, at a given instant of time, the current flow on the inside surface of the slotted inner walls of the rectangular waveguide 10 while an electromagnetic wave is propagating therethrough in the $TE_{10}$ mode. The arrows 20 illustrate the axial currents, and the arrows 21 illustrate the transverse currents. To radiate a field that is polarized perpendicularly to the slot 11, the slot must cut transverse currents. If the slot cuts axial components of current, undesired cross-polarized fields are generated. Thus, the slot 11 is preferably oriented with its edges parallel to the axial currents (i.e., parallel to the axis of the waveguide 10), and the transverse dimension of the slot is made sufficiently narrow that no significant axial currents are cut by the slot and, consequently, no significant cross-polarized fields are radiated. For example, in a WR-284 waveguide, the slot width may be 0.060 inch. Also, the slot should be displaced only slightly from the center line of the waveguide wall. As the distance between the slot and the centerline of the waveguide wall is increased, the slot cuts transverse currents of increasing amplitude and radiates undesired co-polarized (perpendicular) signals of increasing strength.

To cover short distances, e.g., about 60 feet or less, the slot can be located in the narrow wall of a dominant-mode rectangular waveguide. In the narrow wall there are no axial currents to be cut, and the slot must be made extremely narrow to avoid excessive radiation since the transverse currents in the narrow wall have a large amplitude.

In order to radiate energy, the slot 11 must be offset from the longitudinal centerline of the wide waveguide wall of the waveguide 10. However, to avoid any significant attenuation of the signals that are propagated longitudinally through the waveguide, and thereby ensure that the signal is radiated with adequate strength along the entire length of the waveguide, the slot 11 is offset only slightly from the centerline so that the slot cuts the transverse currents at a location where those currents have a relatively low amplitude. Thus, the radiated energy per unit length of the waveguide, as well as the signal radiation-attenuation per unit length of the waveguide, are relatively low. For example, in a WR-284 waveguide having a slotted wide wall, the slot edge closest to the centerline is preferably displaced by about 0.060 inch from the centerline.

The dimensions and location of the slot 11 in the waveguide 10 are selected to produce a substantially flat near-field pattern along the length of the waveguide, and across the operating bandwidth of the system. The near-field pattern of the radiating waveguide preferably varies by less than about ±3 dB over the operating bandwidth of the system and along the length of the waveguide. The bandwidth may be as high as that of the radiating waveguide.

Figure 7B:
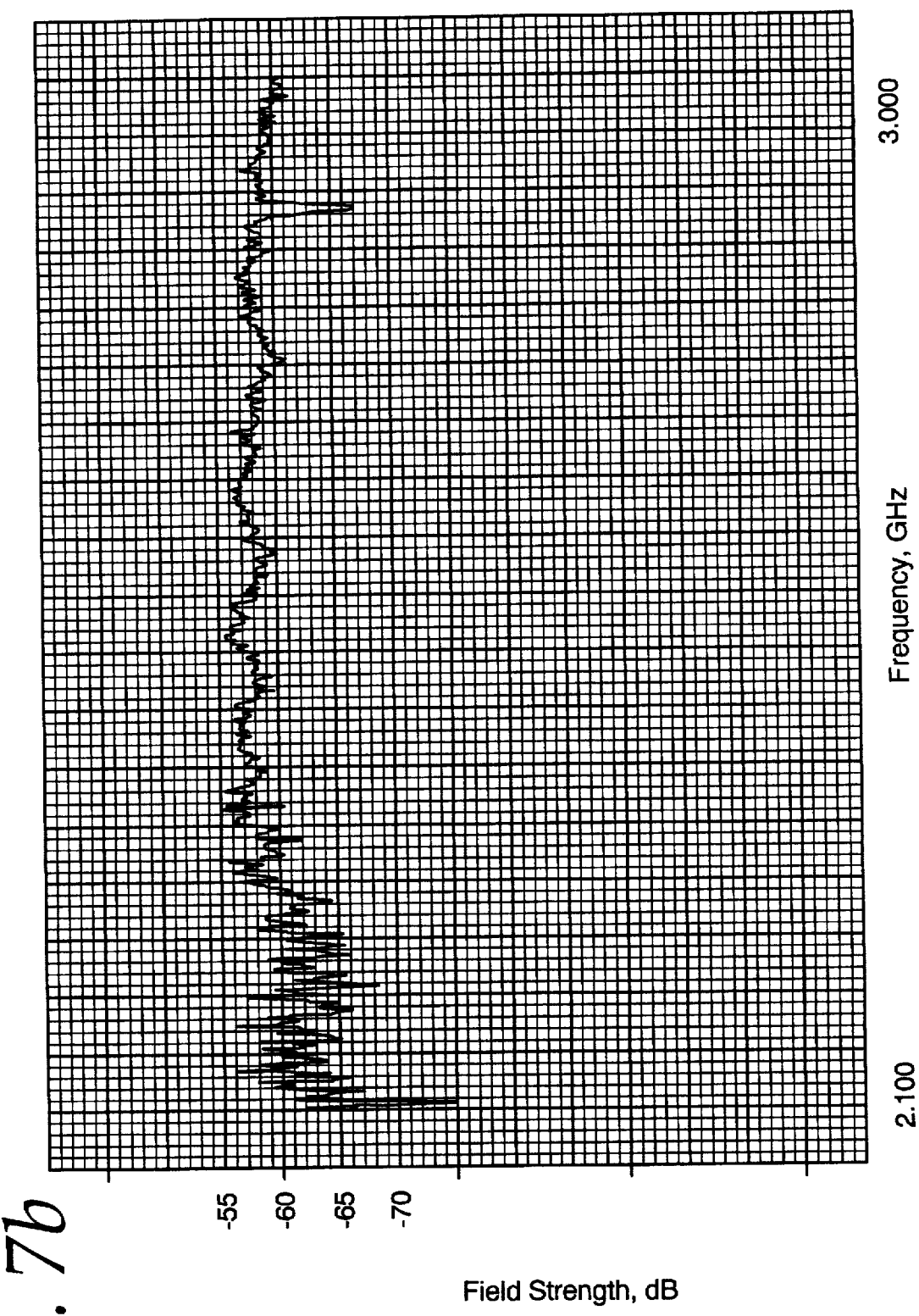
FIG. 7b is a measured (indoors) co-polar amplitude response of one example of the waveguide illustrated in FIG. 1, showing the radiated signal strength measured at a fixed point spaced 20 feet laterally and 30 feet axially away from the waveguide while the frequency of the transmitted signal was swept across the entire operating bandwidth (the predicted response for this case is a straight line, with a slight negative slope, passing through the approximate center of the measured response.
Figure 7C:
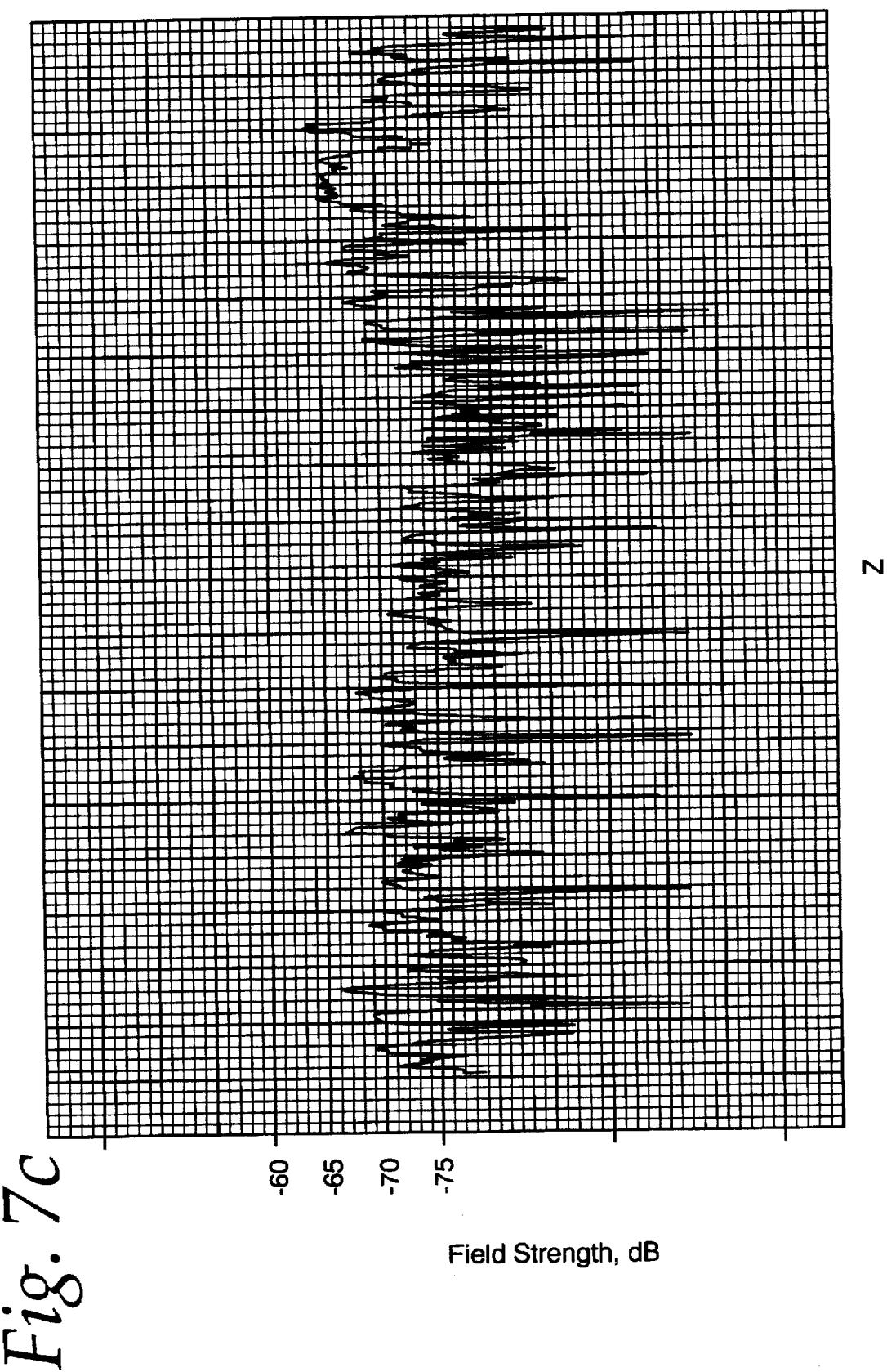
FIG. 7c is the corresponding measured cross-polar field (which is seen to be about 22 dB lower than the co-polar field of FIG. 7a)
Figure 7D:
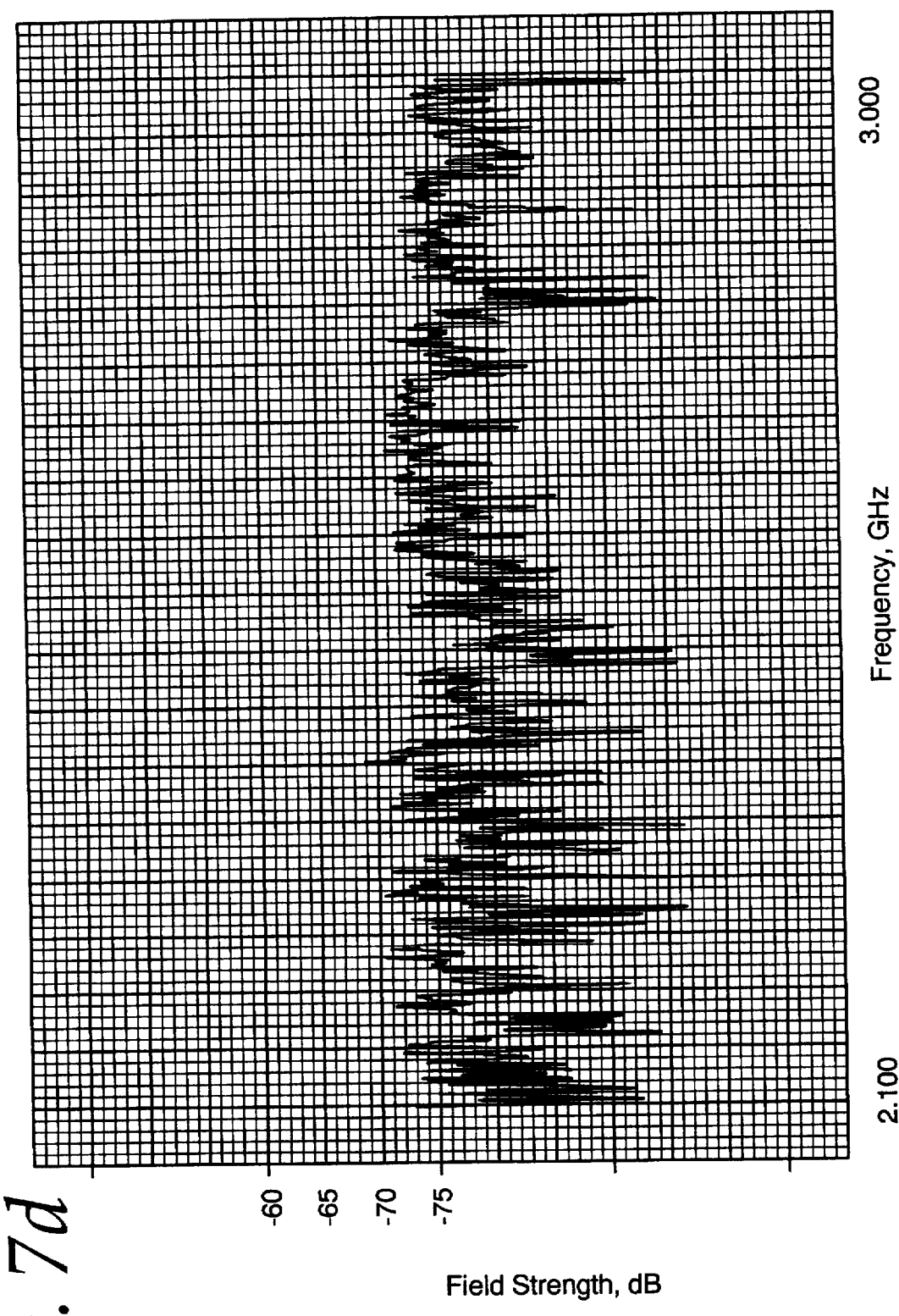
FIG. 7d is the corresponding measured cross-polar field (which is seen to be about 22 dB lower than the co-polar field of FIG. 7b)

FIG. 7a is a measured indoor co-polar near-field pattern of a WR-284 waveguide having a single continuous slot with a width of 0.060 inch and with the centerline of the slot offset 0.090 inch from the centerline of the wide wall containing the slot. The waveguide was 65 feet in length and was operated at a frequency of 2.4 GHz with v/c=2.00, $\hat{\theta}$=60°, and ζ=20 feet, where v is the phase velocity of the signal propagated through the waveguide, c is the speed of light, $\hat{\theta}$ is the angle between the waveguide axis and the plane of the phase front emanating from the slot (as is governed by the equation: cos $\hat{\theta}$=1/(v/c)) and ζ is the perpendicular distance between the measured field point and the waveguide axis. It can be seen that the pattern is substantially flat (starting at z=13 feet), within about ±2 dB, along the entire length of the waveguide and, indeed, approaches the ideal (outdoor) predicted pattern of FIG. 8. The indoor pattern improves as the distance from the waveguide decreases, as seen from the measured co-polar pattern of FIG. 9a for a 5-foot distance. Other measured co-polar patterns, measured outdoors, for the same waveguide and operating frequency were flat within about ±1.5 dB along a 400-foot length of the waveguide, as seen from FIG. 11. In the examples of FIGS. 7, 9, 10 and 11, the measured cross-polar near field was 23 dB below the co-polar near field (e.g., see FIG. 7c), and this low cross-polarization level is the reason for the excellent "flat" co-polar response. All these patterns were measured with a pyramidal pick-up horn oriented with its axis at an angle θ, of 55° (±10°) to the waveguide's axis (thus, θ need not be exactly equal to $\hat{\theta}$ but about ±10° from it).

Figure 7E:
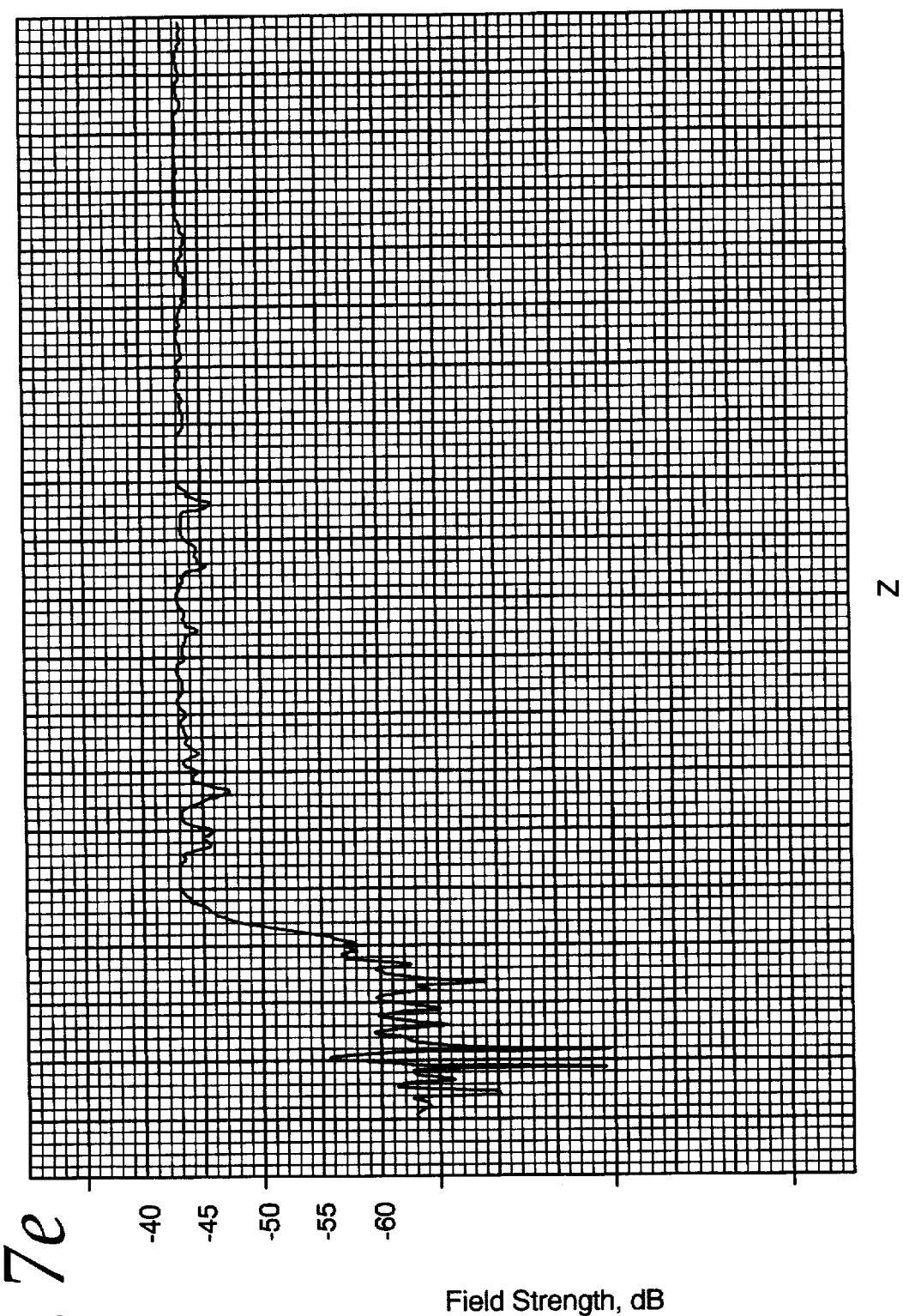
FIG. 7e is a near field co-polar pattern measured under the same conditions as FIG. 7a but with a 3-foot metallic strip inserted on the dry-wall.
Figure 8:
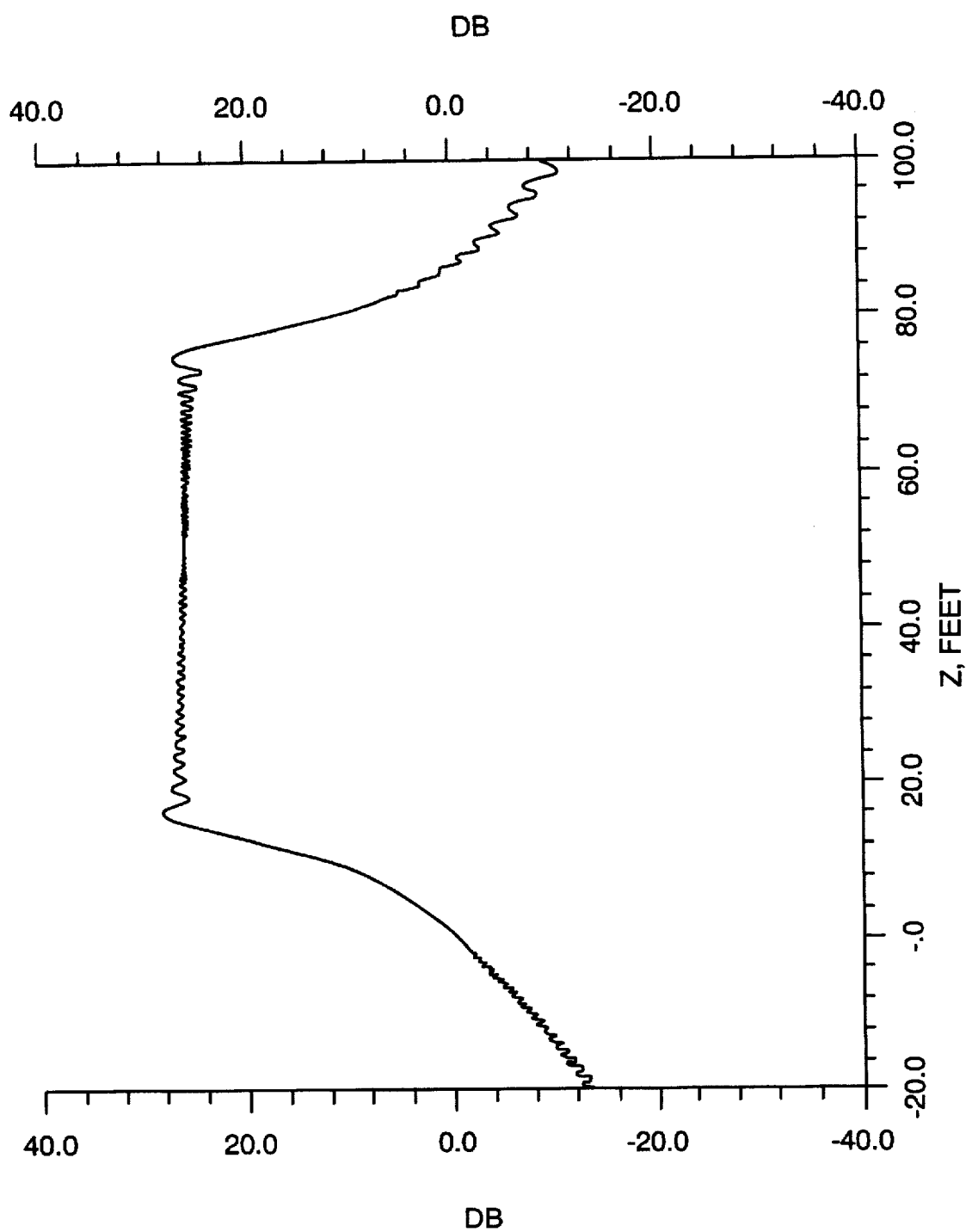

FIG. 7e is the near field co-polar pattern measured under the same conditions as FIG. 7a but with a 3-foot metallic strip inserted on the dry-wall (the fact that FIG. 7e is virtually identical to FIG. 7a indicates that no TWLE exists for this waveguide radiator).

FIG. 7b illustrates the measured co-polar frequency response of the waveguide described above, across the operating bandwidth of the system. The amplitude of the radiated signal was measured at a point 20 feet (ζ=20 feet) laterally away from the waveguide and 30 feet axially (z=30 feet) from the waveguide end connected to the signal generator. The frequency of the signal generator was swept across the frequency band of 2.1 to 3.0 GHz, which is the typical operating bandwidth of WR-284 waveguide. The waveguide slot had the same dimensions and location described above. It can be seen that the measured signal amplitude was substantially flat (±2.5 dB) across the frequency band (except for a dip at 2.881 GHz which was due to the poor VSWR of the coax-waveguide connection to the pick-up horn at this frequency only). The pick-up horn's axis was at an angle of 55° (±10°) to the waveguide's axis.

FIG. 7d again shows the low level (−23 dB) of cross-polarization.

Figure 9A:
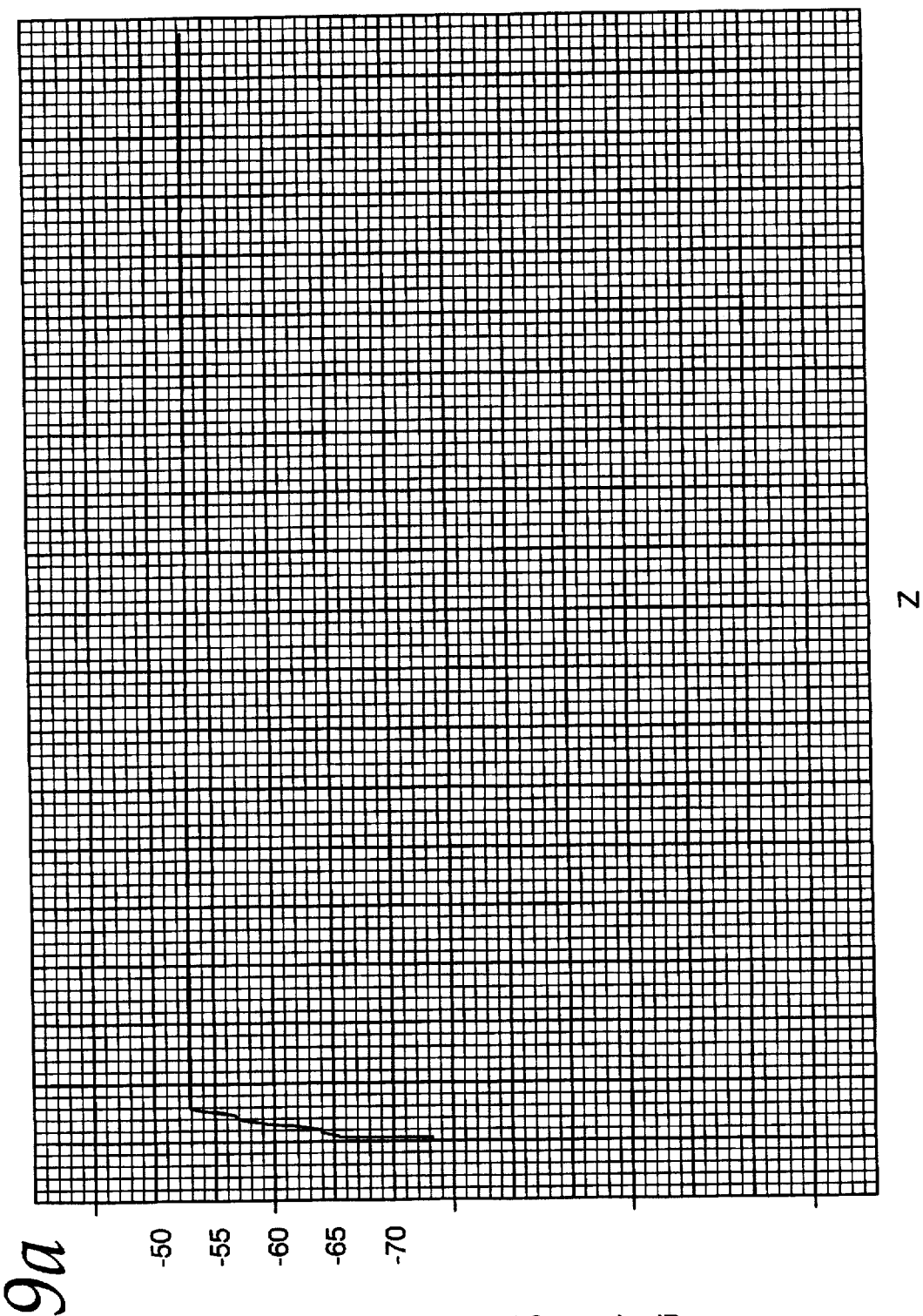
FIG. 9a is a near-field co-polar pattern produced by the same waveguide that produced the pattern of FIG. 7a, measured (indoors) along the length of the waveguide, at a distance 5 feet away from the waveguide, while operating at a fixed frequency, with an impedance-matching load connected to the far end of the waveguide; likewise.
Figure 9B:
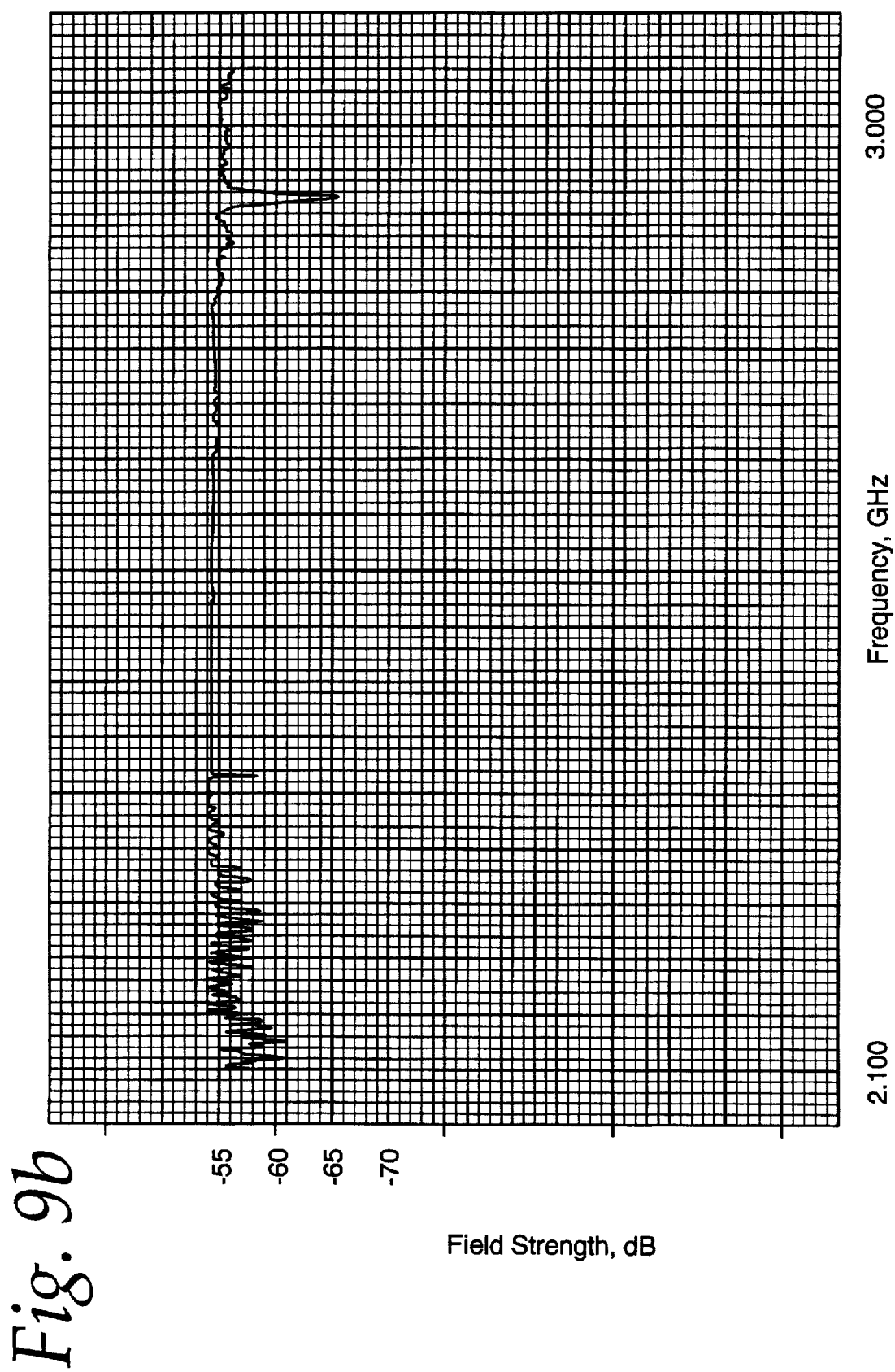
FIG. 9b is a measured amplitude response of the same waveguide, showing the radiated signal strength measured at a fixed point spaced 5 feet laterally away from the waveguide while the frequency of the transmitted signal was swept across the entire operating bandwidth; likewise.
Figure 9C:
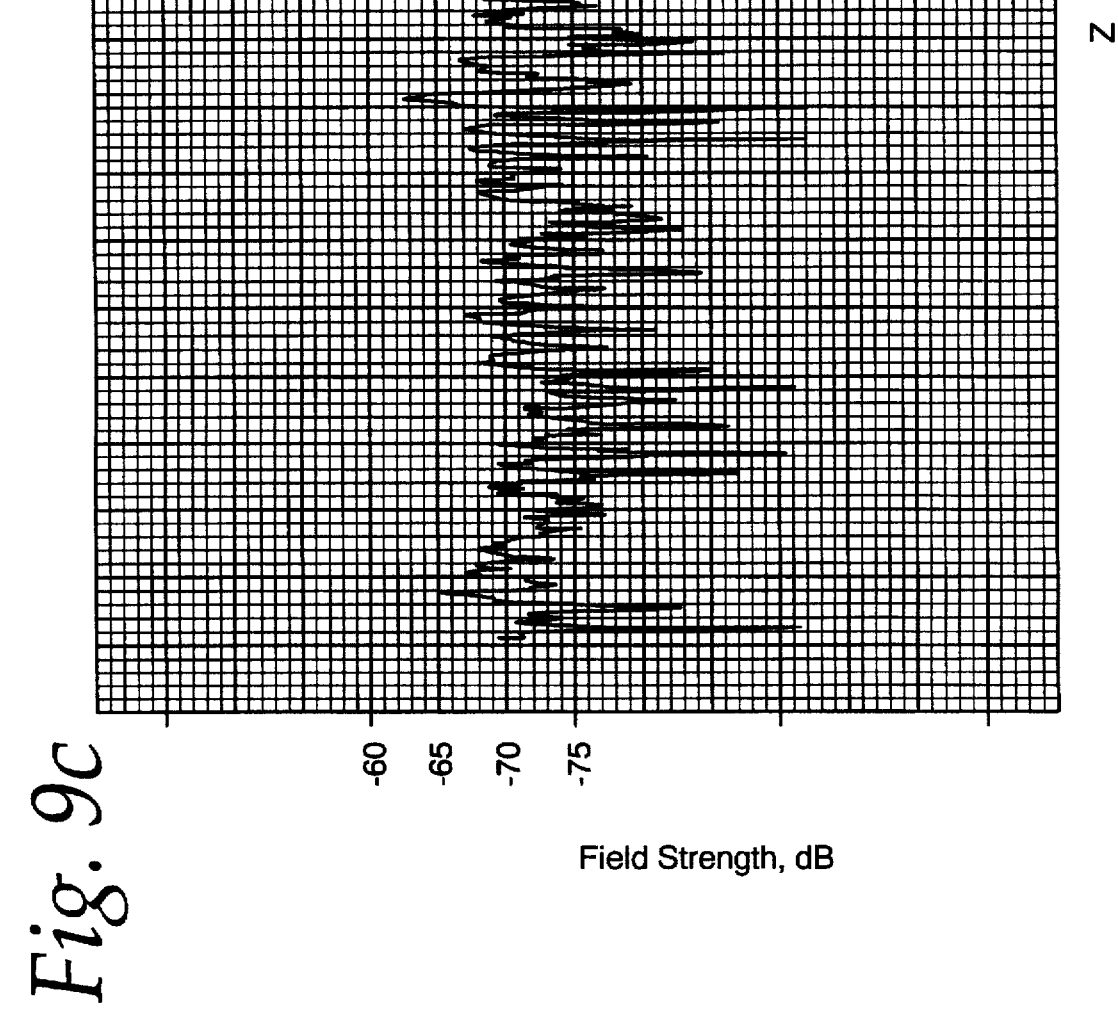
FIG. 9c is the corresponding cross-polar field measured.
Figure 9D:
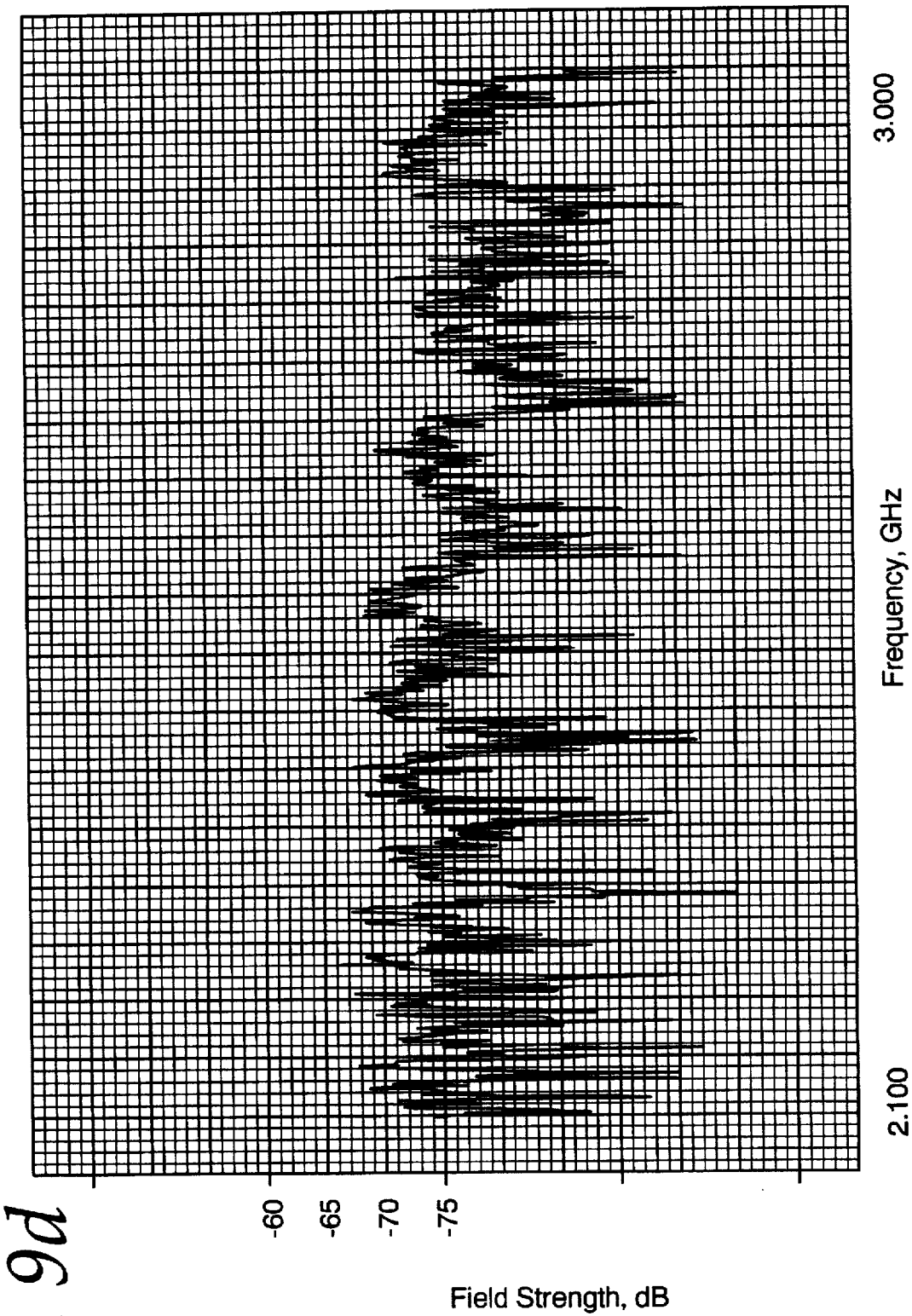
FIG. 9d is the corresponding cross-polar field measured.

FIGS. 9a through 9d are measurements like those of FIGS. 7a through 7d, but taken at a distance of 5 feet from the waveguide. It can be seen that the curves in FIGS. 9a and 9b are even flatter than those in FIGS. 7a and 7b, and FIGS. 9c and 9d again show −23 dB cross polarization.

Figure 10A:
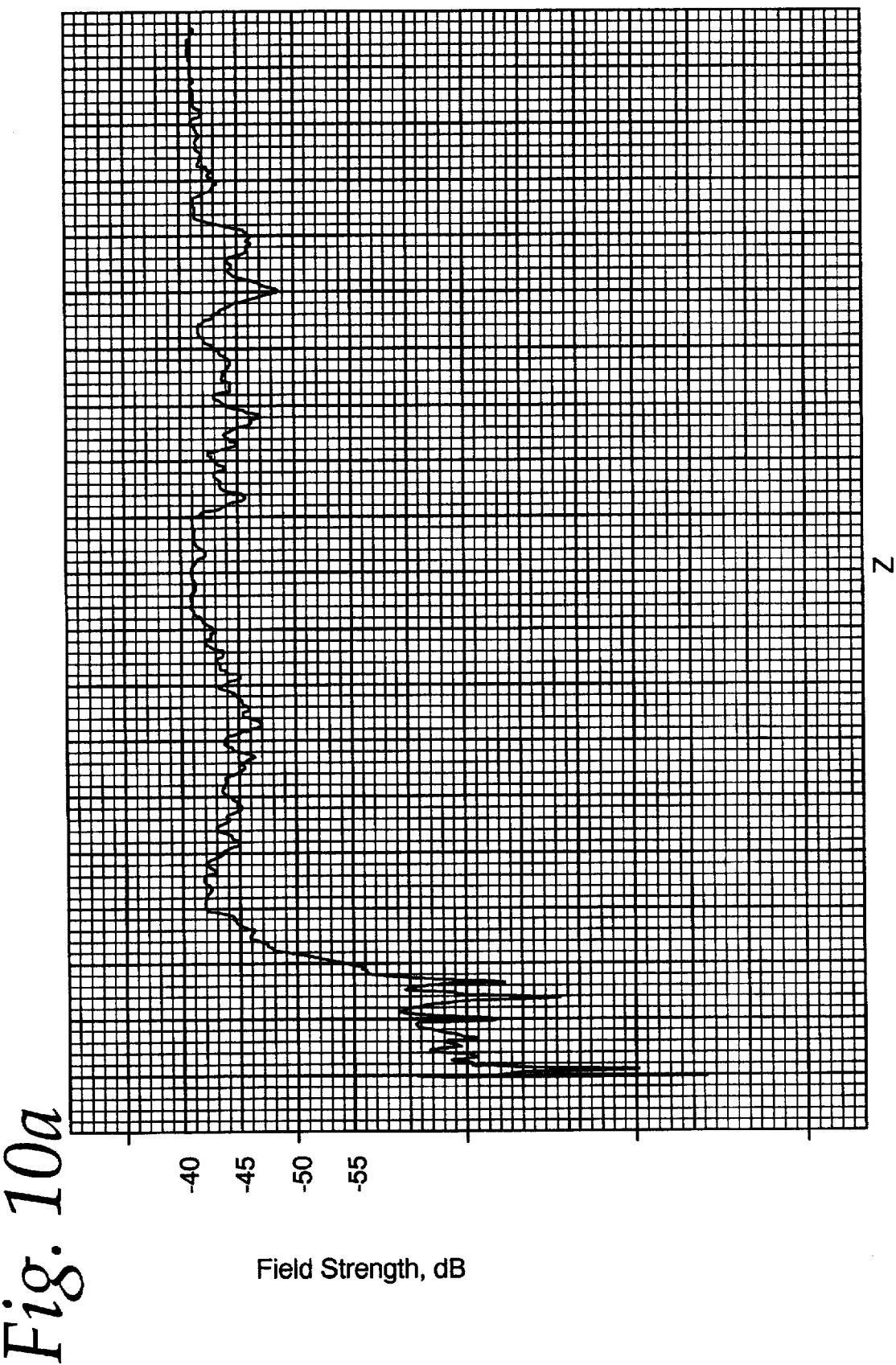
FIG. 10a is a measured (indoor) near-field co-polar pattern (similar to FIG. 7a) of one example of the waveguide illustrated in FIG. 4, measured along the length of the waveguide while operating at a fixed frequency, with an impedance-matching load connected to the far end of the waveguide.
Figure 10B:
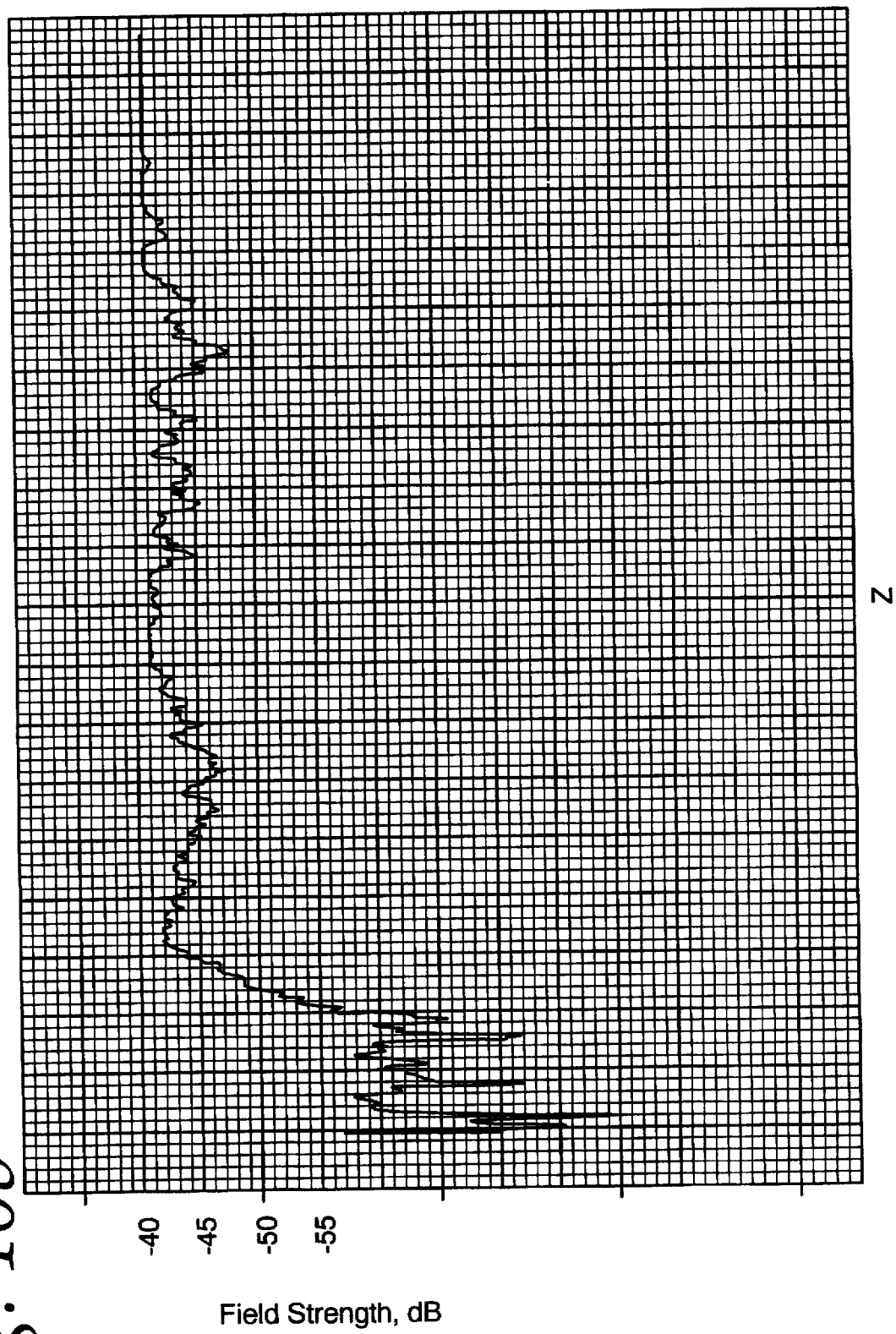
FIG. 10b is another measured (indoor) near-field pattern of the same waveguide that produced the pattern of FIG. 10a, but with a short circuit replacing the impedance-matching load at the far end of the waveguide.
Figure 11:
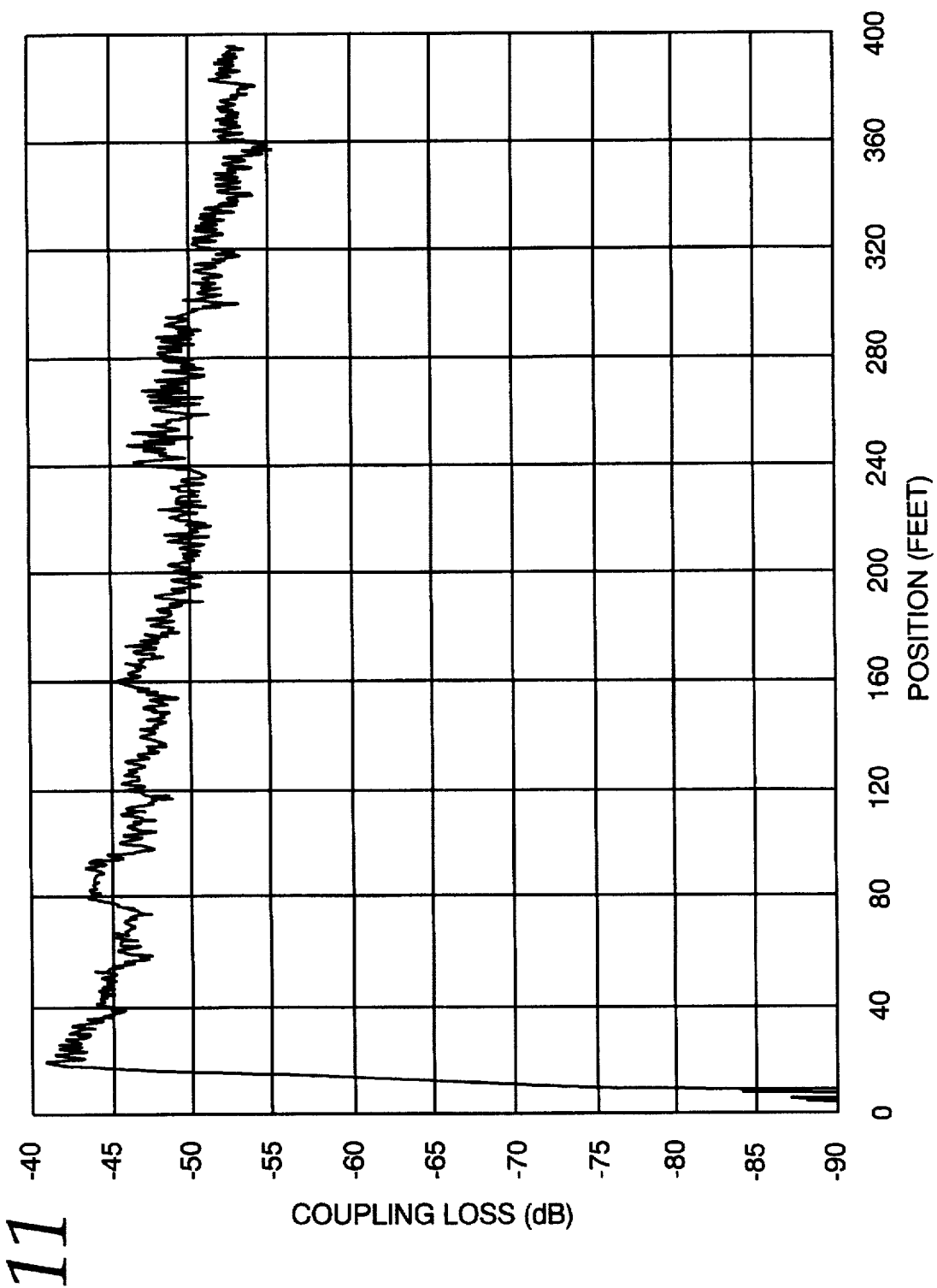
FIG. 11 is a measured (outdoor) co-polar response of a 400-foot run of the waveguide of FIG. 4 measured at a fixed frequency at a distance of 20 feet from the waveguide.

FIGS. 10a and 10b are measured near-field patterns of the same waveguide described above, operated at a fixed frequency of 2.4 GHz (again using a pyramidal pick-up horn oriented at 55° from the waveguide axis). FIG. 10a is the pattern measured with a matched load connected to the end of the waveguide, and FIG. 10b is the pattern measured with a short circuit in place of the matched load. It can be seen that the responses were nearly identical, which indicates that the returning radiated wave from the short circuit end did not interfere with the transmitted radiated wave from the source end. This shows the insensitivity of the field radiated by the waveguide to its termination.

Because the radiating waveguide described above has a substantially flat near-field pattern, it provides reliable communications to and from radio units distributed along the length of the waveguide. This reliability is particularly useful in digital communications because it permits the attainment of low BERs. For example, digital data communications may require BERs as low as $10^{-8}$ to avoid loss of significant data. These low BERs are attainable with a substantially flat near-field pattern because the fluctuations, or oscillations, in the pattern are of such a small amplitude that losses of one or more bits of data are virtually nonexistent. The substantially flat near-field patterns of the present invention are also desirable for analog communication signals, to avoid distortions in the analog signals.

The slotted waveguide 10 preferably has a constant-please front normal to the angle $\hat{\theta}$ in the approximate range of 40° to 67°. The upper limit of 67° is preferred because operation of the waveguide is typically 8% or more above cutoff, i.e., $f/f_c \geq 1.08$, and since $v/c = [1-(f_c/f)^2]^{-\frac{1}{2}}$ and $\cos\hat{\theta} = (v/c)^{-1}$, then $v/c \leq 2.65$ and $\hat{\theta} \leq 68°$. The lower limit of about 40° is preferred to avoid launching the radiation at such a small angle from the waveguide's axis that the beam, for indoor operation, may strike a wall or other surface at or near the load. This could convert some co-polar (transverse) polarization to cross-polar (parallel) polarization and establish, in conjunction with nearby parallel walls (or floor or ceiling), a TWLE, thereby increasing the magnitude of the oscillations and destroying the flatness of the near-field pattern produced. Thus, from the preceding equations, for $\hat{\theta} \geq 40°$, $v/c \geq 1.305$ and $f/f_c \leq 1.56$. The cutoff frequency $f_c$ of a waveguide of any given shape is determined by the inside dimensions of the waveguide. For example, standard WR-284 rectangular waveguide has a cutoff frequency of 2.079 GHz ($\lambda_c = 5.680$ inches) for the $TE_{10}$ mode.

The radio units that receive radiated signals from the waveguide preferably include a directive antenna, such as the pyramidal horn mentioned above, having a slot that is substantially perpendicular (e.g., within plus or minus 10 degrees) to the axis of the main radiation beam from the waveguide. This antenna preferably has a directive gain of at least about 10 dBi, and is positioned to receive radiation from at least about a 10-foot length of the waveguide. Other directive antennas are parabolic reflectors, corner reflectors, and slot or dipole arrays.

Analysis and computations indicate that the single continuous slot 11 used in the waveguide of FIGS. 1 and 2 can be approximated by a single row of slot segments, provided that at least approximately $[1+(v/c)^{-1}]$ slots are provided in each $\lambda$ of waveguide length (where $\lambda$ is the wavelength in free space at the operating frequency since this insures that only a single beam of radiation from the slot will occur).

As mentioned previously, waveguide configurations other than the rectangular waveguide illustrated in FIGS. 4–6 may be used in the system of this invention. Examples of other waveguide configurations, and suitable locations for the radiating slot in each configuration, are illustrated in FIG. 12. While locations C in FIG. 12 have been illustrated as being directly on a transverse axis of symmetry, it will be understood from the above description of the location of the slot 11 that the slots at locations C should always be offset slightly from the axis of symmetry. In locations C in FIG. 12, the slot intersects primarily transverse currents in the waveguide wall, at a point where the amplitude of the transverse currents is sufficiently low to avoid excessive radiation attenuation of the signals that are propagated longitudinally through the waveguide. Little or no axial currents are cut by the slots at locations C so that only co-polar (perpendicular) radiation occurs. This is the typical case used for long runs of waveguide.

For short runs (e.g., less than about 60 feet) slots may be formed at locations H, where the amplitude of the transverse currents is high. The slots at locations H should be extremely narrow to avoid excessive radiation and should be symmetrically disposed in the transverse direction to avoid cross-polar radiation.

A particularly useful configuration is that of FIG. 12b (elliptical cross section) since it can be readily manufactured in flexible form and made to have the appropriate number of displaced-segmented slots in its broad wall (for long runs) or in its narrow wall (for short runs).

We claim:

1. A radiating waveguide comprising
   an elongated waveguide having a transverse cross-section dimensioned to carry only the dominant mode at a selected operating frequency,
   one wall of said waveguide forming a continuous non-resonant longitudinal slot to produce a radiated field polarized perpendicularly to the slot,
   said slot extending substantially parallel to the axis of the waveguide and having a transverse dimension that is sufficiently narrow to substantially avoid the radiation of a field polarized parallel to the slot, said slot being dimensioned and located so that the amount of transverse currents intersected by the slot are sufficiently small to avoid significant radiation-attenuation of signals propagating longitudinally through the waveguide, and
   means for feeding the waveguide at one end thereof.

2. The radiating waveguide of claim 1 wherein said slot comprises a series of openings spaced along the length of said waveguide and includes at least about $[1+(v/c)^{-1}]$ openings per free space wavelength, with v being the phase velocity of the signal propagated through the waveguide and c being the speed of light.

3. The radiating waveguide of claim 1 wherein the dimensions and location of the slot in the waveguide are selected to produce a substantially flat frequency response, in the near field along the length of the waveguide.

4. The radiating waveguide of claim 1 wherein the dimensions and location of the slot in the waveguide are selected to produce a near-field pattern having an amplitude that is substantially constant, at a given frequency, along the length of the waveguide.

5. The radiating waveguide of claim 1 wherein said waveguide is a rectangular waveguide, and said slot is formed in a wide wall of said waveguide to achieve a sufficiently low rate of radiation per unit length of waveguide, to make the radiating waveguide useful for waveguide lengths in excess of 60 feet.

6. The radiating waveguide of claim 1 wherein said waveguide is a rectangular waveguide, and said slot is a narrow slot formed in a narrow wall of said waveguide to achieve a high rate of radiation per unit length of waveguide to make the radiating waveguide useful for short lengths.

7. A radiating waveguide comprising an elongated rectangular waveguide dimensioned to carry only the dominant mode at the operating frequency, a wide wall of said waveguide containing a continuous non-resonant longitudinal slot to produce a radiated field polarized perpendicularly to the slot, said slot extending parallel to the axis of the waveguide and having a narrow transverse dimension so that no significant axial currents are cut by the slot and thus no significant cross-polarized fields are generated, and said slot being dimensioned and located to intersect transverse currents in the waveguide wall so that signals propagating longitudinally through the waveguide are radiated laterally from the waveguide at an angle $\hat{\theta}$ from the waveguide's axis with $\cos \hat{\theta} = (v/c)^{-1} = [1-(f_c/f)^2]^{-1/2}$, v being the phase velocity of the signal propagated through the waveguide, c being the speed of light, $f_c$ being the cutoff frequency of the waveguide and f the operating frequency, the amount of transverse currents intersected by the slot being sufficiently small to avoid significant radiation-attenuation of signals propagating longitudinally through the waveguide.

8. A method of communicating among a multiplicity of radio units selected from the group consisting of radio transmitters, receivers, or transceivers located within a prescribed area, said method comprising locating an elongated waveguide within or adjacent to said prescribed area for transmitting radiated signals to, and receiving radiated signals from, said radio units along the length of the waveguide, the waveguide including at least one continuous longitudinal slot to produce a radiated field polarized perpendicularly to the axis of the waveguide, and having a near field encompassing the prescribed area containing the radio units, the dimensions and location of the slot in the waveguide being selected to produce a substantially flat amplitude response in the near field along the length of the waveguide, said slot being dimensioned and located so that the amount of transverse currents intersected by the slot are sufficiently small to avoid significant radiation-attenuation of signals propagating longitudinally through the waveguide.

9. The method of claim 8 wherein said slot is substantially parallel to the axis of the waveguide.

10. The method of claim 8 wherein said amplitude response, at a given near-field point, is substantially flat over the bandwidth of said waveguide.

11. The method of claim 8 wherein said frequency response is substantially flat over the operating bandwidth of said radio units.

12. The method of claim 8 wherein said waveguide is a rectangular waveguide, and said slot is located in a wide wall of the waveguide, extends parallel to the axis of the waveguide, and has a very narrow transverse dimension so that no significant axial currents are cut by the slot and thus no significant cross-polarized fields are generated.

13. The method of claim 12 wherein said slot is offset only slightly from the longitudinal centerline of the wide wall of the waveguide to avoid any significant radiation attenuation of signals propagated longitudinally through the waveguide.

14. The method of claim 8 wherein the slot width and location are selected to avoid any significant radiation attenuation of signals propagated longitudinally through the waveguide.

15. The method of claim 8 wherein said waveguide is at least about 60 feet in length.

16. The method of claim 8 wherein said slot comprises a series of openings spaced along the length of said waveguide and includes at least about $[1+(v/c)^{-1}]$ openings per free space wavelength at the operating frequency, with v being the phase velocity of the signal propagated through the waveguide and c being the speed of light.

17. The method of claim 8 wherein the amplitude of said near-field pattern fluctuates by less than about ±3 dB.

18. A method of communicating among a multiplicity of radio units selected from the group consisting of radio transmitters, receivers, or transceivers located within a prescribed area, said method comprising locating an elongated waveguide within or adjacent to said prescribed area for transmitting radiated signals to, and receiving radiated signals from, said radio units along the length of the waveguide, the waveguide including at least one longitudinal slot to produce a radiated field polarized perpendicularly to the axis of the waveguide, and having a near field encompassing the prescribed area containing the radio units, the dimensions and location of the slot in the waveguide being selected to produce a near-field pattern having an amplitude that is substantially constant, at a given frequency, along the length of the waveguide, said slot being dimensioned and located so that the amount of transverse currents intersected by the slot are sufficiently small to avoid significant radiation-attenuation of signals propagating longitudinally through the waveguide.

19. The method of claim 18 wherein said slot is substantially parallel to the axis of the waveguide.

20. The method of claim 18 wherein the slot width and location are selected to avoid any significant radiation-attenuation of signals propagated longitudinally through the waveguide.

21. The method of claim 18 wherein said waveguide is a rectangular waveguide, and said slot is located in a wide wall of the waveguide, extends parallel to the axis of the waveguide, and has a narrow transverse dimension so that no significant axial currents are cut by the slot and thus no significant cross-polarized fields are generated.

22. The method of claim 21 wherein said slot is offset only slightly from the longitudinal centerline of the wide wall of the waveguide to avoid any significant radiation-attenuation of signals propagated longitudinally through the waveguide.

23. The method of claim 21 wherein said waveguide is at least about 60 feet in length.

24. The method of claim 21 wherein said slot comprises a series of openings spaced along the length of said waveguide and includes at least about $[1+(v/c)^{-1}]$ openings per free space wavelength at the operating frequency, with v being the phase velocity of the signal propagated through the waveguide and c being the speed of light.

25. The method of claim 21 wherein the amplitude of said near-field pattern fluctuates by less than about ±3 dB.

26. A digital communication system having the capability of two-way transmission of digital signals at high data rates with negligible bit error rates, said system comprising a multiplicity of radio units selected from the group consisting of radio transmitters, receivers, or transceivers located within a prescribed area, an elongated waveguide located within or adjacent to said prescribed area for transmitting radiated signals to, and receiving radiated signals from, said radio units along the length of the waveguide, the waveguide including at least one continuous longitudinal slot to produce a radiated field polarized perpendicularly to the axis of the waveguide, and having a near field encompassing the prescribed area containing the radio units, the dimensions and location of the slot in the waveguide wall being selected to produce a substantially flat amplitude response in the near field along the length of the waveguide, said slot being dimensioned and located so that the amount of transverse currents intersected by the slot are sufficiently small to avoid significant radiation-attenuation of signals propagating longitudinally through the waveguide.

27. The system of claim 26 wherein said slot is substantially parallel to the axis of the waveguide.

28. The system of claim 26 wherein each of said radio units includes a directive antenna oriented to receive the radiation from said slot in said waveguide.

29. The system of claim 28 wherein said directive antenna has a slot which is substantially perpendicular to the axis of the main radiation beam from said slot of said waveguide.

30. The system of claim 28 wherein said antenna has a slot which is within 10 degrees of a plane that is perpendicular to the axis of the main radiation beam from said slot of said waveguide.

31. The system of claim 28 wherein said antenna has a directive gain of at least about 10 dBi.

32. The system of claim 28 wherein said antenna is positioned to receive radiation from at least about a 60-foot length of said waveguide.

33. A digital communication system having the capability of two-way transmission of digital signals at high data rates with negligible bit error rates, said system comprising a multiplicity of radio units selected from the group consisting of radio transmitters, receivers, or transceivers located within a prescribed area, an elongated waveguide located within or adjacent to said prescribed area for transmitting radiated signals to, and receiving radiated signals from, said radio units along the length of the waveguide, the waveguide including at least one longitudinal slot to produce a radiated field polarized perpendicularly to the axis of the waveguide, and having a near field encompassing the prescribed area containing the radio units, the dimensions and location of the slot in the waveguide being selected to produce a near-field pattern having an amplitude that is substantially constant, at a given frequency, along the length of the waveguide, said slot being dimensioned and located so that the amount of transverse currents intersected by the slot are sufficiently small to avoid significant radiation-attenuation of signals propagating longitudinally through the waveguide.

34. The system of claim 33 wherein said slot is substantially parallel to the axis of the waveguide.

35. The system of claim 33 wherein each of said radio units includes a directive antenna oriented to receive the radiation from said slot in said waveguide.

36. The system of claim 35 wherein said directive antenna has a slot which is substantially perpendicular to the axis of the main radiation beam from said slot of said waveguide.

37. The system of claim 35 wherein said antenna has a slot which is within 10 degrees of a plane that is perpendicular to the axis of the main radiation beam from said slot of said waveguide.

38. The system of claim 35 wherein said antenna has a directive gain of at least about 10 dBi.

39. The system of claim 35 wherein said antenna is positioned to receive radiation from at least about a 60-foot length of said waveguide.

\* \* \* \* \*